(12) United States Patent
Rosas-Maxemin et al.

(10) Patent No.: US 10,621,794 B2
(45) Date of Patent: Apr. 14, 2020

(54) SYSTEMS AND METHODS FOR WIRELESS MEDIA DEVICE DETECTION

(71) Applicant: Pied Parker, Inc., Palo Alto, CA (US)

(72) Inventors: Gianni Rosas-Maxemin, Palo Alto, CA (US); Robert Mazzola, Palo Alto, CA (US); Francisco Sandoval, Palo Alto, CA (US); Callam Poynter, Palo Alto, CA (US)

(*) Notice: Subject to any disclaimer, the term of this patent is extended or adjusted under 35 U.S.C. 154(b) by 67 days.

(21) Appl. No.: 16/169,797

(22) Filed: Oct. 24, 2018

(65) Prior Publication Data

US 2019/0122449 A1 Apr. 25, 2019

Related U.S. Application Data

(60) Provisional application No. 62/577,146, filed on Oct. 25, 2017.

(51) Int. Cl.
| | |
|---|---|
| *G07B 15/02* | (2011.01) |
| *G06Q 10/02* | (2012.01) |
| *G08G 1/14* | (2006.01) |
| *G07C 9/28* | (2020.01) |
| *G06K 19/06* | (2006.01) |

(52) U.S. Cl.
CPC ......... *G07B 15/02* (2013.01); *G06Q 10/02* (2013.01); *G07C 9/28* (2020.01); *G08G 1/144* (2013.01); *G08G 1/146* (2013.01); *G08G 1/148* (2013.01); *G06K 19/06037* (2013.01)

(58) Field of Classification Search
CPC .... G06Q 10/02; G06Q 50/30; G06Q 2240/00; G07B 15/00; G07B 15/02
See application file for complete search history.

(56) References Cited

U.S. PATENT DOCUMENTS

| | | | |
|---|---|---|---|
| 9,542,460 B1* | 1/2017 | Balasubramanian | ................... G06F 16/90328 |
| 2009/0204319 A1* | 8/2009 | Shanbhag | .......... G01C 21/3423 701/533 |
| 2010/0088127 A1* | 4/2010 | Betancourt | ............ G06Q 10/02 705/5 |

(Continued)

OTHER PUBLICATIONS

Yip, Car Park Reservation System, City Univ. of Hong Kong Dept. of Computer Science Final Year Report (Year: 2012).*

(Continued)

*Primary Examiner* — Daniel Vetter
(74) *Attorney, Agent, or Firm* — Zheng "Andy" Liu

(57) ABSTRACT

Vehicular movement detection systems and methods are disclosed. One or more computing devices are configured to monitor location data associated with a first user device. It is determined that a first user device enters a geographic area based on the location data. In response to determining that first user device has entered or departed a geographic area, a message is prompted on the first user device using a first software application. The message includes executable instructions that launch a second application the first user device, and cause the first user device to transmit a search request for a listing location with one or more search request parameters automatically generated in response to the executable instructions. A confirmation identifier is received by the first user device, the confirmation identifier being useable for unlocking a secured area.

20 Claims, 11 Drawing Sheets

(56) References Cited

U.S. PATENT DOCUMENTS

| | | | |
|---|---|---|---|
| 2010/0113066 A1* | 5/2010 | Dingler | H04W 4/02 455/456.3 |
| 2010/0191584 A1* | 7/2010 | Fraser | G06Q 30/0207 705/13 |
| 2011/0109426 A1* | 5/2011 | Harel | G06Q 50/10 340/5.6 |
| 2011/0166897 A1* | 7/2011 | Beckman | G06Q 10/02 705/5 |
| 2013/0226627 A1* | 8/2013 | Kubovcik | G06Q 10/02 705/5 |
| 2014/0236686 A1* | 8/2014 | Grush | G07B 15/02 705/13 |
| 2015/0066545 A1* | 3/2015 | Kotecha | G06Q 10/02 705/5 |
| 2015/0254611 A1* | 9/2015 | Perez | G06Q 10/08355 705/5 |
| 2015/0262430 A1* | 9/2015 | Farrelly | H04L 67/306 705/13 |
| 2015/0287072 A1* | 10/2015 | Golden | G06Q 30/0244 705/14.43 |
| 2016/0117724 A1* | 4/2016 | Tseng | G06Q 30/0251 705/14.49 |
| 2017/0186317 A1* | 6/2017 | Franklin | G08G 1/149 |
| 2017/0193551 A1* | 7/2017 | Santi | G06F 16/9535 |
| 2017/0345105 A1* | 11/2017 | Isaacson | H04L 63/06 |
| 2018/0109909 A1* | 4/2018 | Banerjee | H04W 4/02 |
| 2018/0313661 A1* | 11/2018 | Eyster | G08G 1/144 |
| 2019/0035273 A1* | 1/2019 | Garrick | G01C 21/3685 |

OTHER PUBLICATIONS

Lin, Cal Poly Application Parking Feature Integration, Cal Poly State University San Luis Obispo Electrical Engineering Program (Year: 2015).*

Watene, et al., A GIS-Based Parking Management and Dissemination System, Proceedings of 2013 Mechanical Engineering Conference on Sustainable Research and Innovation, vol. 5, Apr. 24-26, 2013 (Year: 2013).*

Rinne, et al., Mobile crowdsensing of parking space using geofencing and activity recognition, 10th ITS European Congress, Helsinki, Finland, Jun. 16-19, 2014 ERTICO (Year: 2014).*

\* cited by examiner

SYSTEMS AND METHODS FOR WIRELESS MEDIA DEVICE DETECTION

CROSS-REFERENCE TO RELATED APPLICATIONS

The present application claims the benefit of U.S. Provisional Application No. 62/577,146, filed on Oct. 25, 2017, which is hereby incorporated by reference in its entirety.

TECHNICAL FIELD

The present disclosure relates generally to detecting wireless devices, and more specifically, to generating search requests for listing locations in response to detecting wireless devices.

BACKGROUND

Parking a vehicle in densely populated environments is often a frustrating and time-consuming experience, with few available parking spaces and major street congestion. This is especially true in populated urban environments such as the downtowns of large municipalities (e.g., New York City, San Francisco, etc.). Moreover, parking is often in high demand near destinations or event venues such as neighborhoods surrounding sports stadiums, concert halls, amusement parks, or beach fronts.

Additionally, the high price of real estate has motivated many property owners to seek out non-traditional ways for property owners to monetize their real property assets. For example, homeowners often rent out rooms in their homes to tourists or travelers using an online home rental platform and car drivers provide taxi services using their personal vehicle to pedestrians using a ride sharing platform.

With traditional booking systems, a user may approach a parking lot and may pay for parking or receive a physical parking ticket in order to pay at a later time. These systems require expensive hardware and physical paper tickets for verifying payment. These systems are outdated, slow, and inaccurate.

SUMMARY

A wireless media detection system and methods of operation are disclosed. According to one embodiment, a system includes a non-transitory memory and one or more processors coupled thereto. The one or more processors are configured to execute instructions comprising: monitoring location data associated with a first mobile device; determining the first mobile device has entered or departed a geographic area, wherein the determining is based on one of: i) capturing, by a camera of the first mobile device, a coded image; ii) receiving, by the first mobile device, a signal within the geographic area, the signal including an identifier; and iii) determining a location of the first mobile device has crossed a predetermined geographic boundary; using a first software application on the first mobile device, prompting a message on the first mobile device in response to determining the first mobile device has entered or departed the geographic area, the message including executable instructions; causing the executable instructions to be executed on the first mobile device, the executable instructions causing a second software application associated with the parking service provider to be launched on the first mobile device in response to executing the executable instructions; and transmitting, by the first mobile device, a search request for a first listing location including one or more search request parameters automatically generated in response to execution of the executable instructions.

According to another embodiment, the predetermined virtual boundary is dynamically adjusted using machine learning.

According to yet another embodiment, it is determined the first mobile device has entered or departed the geographic area in response to matching, by the first mobile device, a unique identifier included in a signal sent by a broadcast device.

According to yet another embodiment, the operations further comprise determining the first mobile device has entered or departed the geographic area based on a machine learning model.

According to yet another embodiment, the operations further comprise capturing, by the first mobile device, a coded image. According to yet another embodiment, it is determined the first mobile device has entered the geographic area in response to matching, by the first mobile device, a unique identifier within a signal sent by a broadcast device with a second unique identifier associated with the coded image.

According to yet another embodiment, the message includes a deep link. According to yet another embodiment, activation of the deep link causes the launching of the second application on the first mobile device and generates one or more search request parameters included in the search request.

According to yet another embodiment, the search request parameters include one or more of the group consisting of proximity of the first mobile device to listing locations, temporal duration of reservation period, price range for listing locations, and a type of listing location.

According to another embodiment, a method of wireless device detection includes a computing device coupled to a database including information about a plurality of listing locations, the computing device including one or more processors and memory storing one or more programs for execution by one or more processors. The one or more processors, when executing the one or more programs, are caused to perform a method comprising: monitoring location and sensor data associated with a first mobile user device; determining the first mobile user device has entered or departed a geographic area based on the location and sensor data associated with the first mobile user device; using a first software application associated with the parking service provider on the first mobile user device, providing a user-selectable message on the first mobile user device in response to the determination that the first mobile user device has entered or departed the geographic area, the message including executable instructions; launching a second software application associated with the parking service provider to be launched on the first mobile user device in response to executing the executable instructions; and transmitting, by the first user device, a search request for a first listing location including one or more search request parameters determined based on execution of the executable instructions.

According to yet another embodiment, determining the first user device has entered or departed the geographic area is based on the location data and a predetermined virtual boundary. According to yet another embodiment, the predetermined virtual boundary is a geofenced location enabled via a mesh network.

According to yet another embodiment, determining the first mobile user device has entered or departed the geographic area is based on matching, by the first user device, a unique identifier within a signal sent by a broadcast device with a plurality of unique identifiers.

According to yet another embodiment, determining the first mobile user device has entered the geographic area is further based on matching, by the first mobile user device, the unique identifier within the signal sent by the broadcast device with a second unique identifier extracted from a coded image.

According to yet another embodiment, the message includes a deep link.

According to yet another embodiment, the first user device is an on-board vehicle computer.

According to yet another embodiment, transmitting the search request for the first listing location is performed in response to determining that the first mobile user device is within a designated area.

According to yet another embodiment, transmitting the search request for the first listing location is performed in response to detecting network connectivity.

According to yet another embodiment, further comprising receiving, by the first user device, a confirmation identifier, the confirmation identifier configured to cause a secured area to become unlocked.

According to one embodiment, a system includes a non-transitory memory and one or more processors coupled thereto. The one or more processors are configured to execute instructions comprising: monitoring sensor data and location data of a first wireless device; using a first software application on the first wireless device, prompting a message on the first wireless device in response to determining the first wireless device has entered or departed a geographic area, the message including executable instructions; launching a second application on the first wireless device in response to executing the executable instructions; transmitting, by the first wireless device, a search request for a first listing location including one or more search request parameters automatically generated in response to execution of the executable instructions; receiving a confirmation identifier; and transmitting the confirmation identifier, the confirmation identifier causing a secured area to become unlocked.

Figure 1:
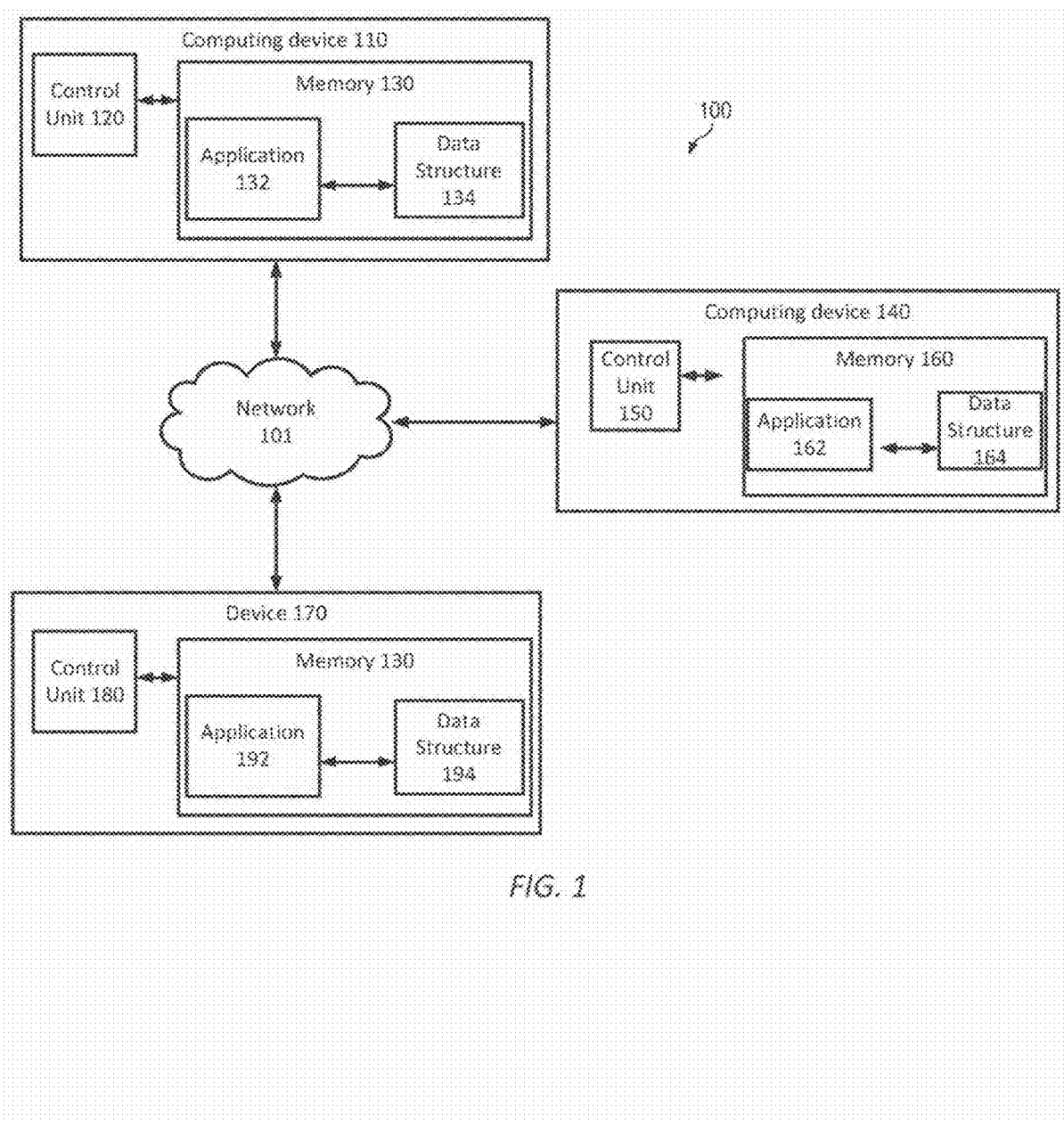
FIG. 1 is an example diagram of a distributed computing system according to some embodiments.

In the figures, elements having the same designations have the same or similar functions.

DETAILED DESCRIPTION

Using shared economy parking applications, smartphone owners may use on-demand parking systems to pay property owners for use of their parking space(s). However, applications rely on user input to determine arrival and departure of vehicles in parking spaces, or on expensive sensors. Accordingly, it would be desirable to provide improved methods and systems of detecting the presence of smartphones in areas with parking spaces and providing smartphone users with options to automatically reserve parking spaces.

The foregoing problems are addressed by aspects of the subject technology that provide systems and methods for prompting a message including a search request for a listing location when a wireless device enters or departs a geographic area and initiating a second software application on the first wireless device to transmit the search request.

In practice, suppose that a smartphone user enters a parking lot and does not have a parking application (parking app) installed, such as PIED PARKER, that enables online payment for parking reservations. The smartphone may receive a notification or other message once it is close to the parking lot, the notification etc. may include a link to open up an application that enables such online payment for parking transactions. If the parking app is already downloaded, information about the user may be used to autocomplete parameters for a parking space request that may be automatically transmitted by the smartphone. This request may be sent to the parking application servers which process the transaction. The parking app sends back verification of the reservation or the user may complete the verification for the parking space to be reserved within the parking lot. In some cases, the user may not have access to a data network upon entering the parking lot, and the parking space may be paid once a data network is available.

Suppose also that a smartphone user is entering a parking lot equipped with technology that can communicate with their smartphone, or in some cases their vehicle, and the user wants to quickly pay for parking. The smartphone or vehicle may be equipped with a device to scan or receive signals, and the parking lot may have a quick response (QR) code or other coded image that includes information such that, when recognized, the smartphone auto-completes a transaction or opens up a link to a parking app such as PIED PARKER, autofilled information about the parking space and/or parking lot automatically. This may be extremely convenient for a user because the user may be multitasking and entering information is one less thing for the user to worry about while trying to get to a popular event, for instance. The user may then confirm the transaction and receive a receipt for payment. The smartphone may also be equipped with short-range wireless communication technology, that enables the smartphone to receive signals that include information to render payment through the parking app. Upon entering and/or leaving a parking lot, a driver may receive a notification on their smartphone with the short-range wireless communication technology enabled. Opening the notification may open the parking app to allow the user to enter and/or exit the parking lot. In some aspects, the user may have set preferences to automatically confirm entrance and/or exit via the smartphone with or without prompt.

Suppose also that a smartphone is provided with a unique identifier, this unique identifier may enable the smartphone user to unlock a secured area, such as a vehicle, a locker such as an AMAZON LOCKER, a gate arm, garage, or even a bike or scooter.

Such intelligent parking systems increase efficiency with respect to parking, reduce traffic, reduce accidents, diminish or eliminate the need for vehicle operator (i.e., user) input, more accurately predict parking needs, increase security, and lead to faster processing of parking transactions. By shortening the time spent looking for parking for vehicles, less cars will be on the road looking for parking, significantly decreasing traffic. Furthermore, intelligent parking systems decrease walking distance for users from their parking spot to their destination and decrease costs associated with parking.

FIG. 1 is a simplified diagram of a distributed computing system 100 according to some embodiments. As shown in FIG. 1, system 100 includes three computing devices 110, 140, and 170. One of ordinary skill would appreciate that distributed computing system 100 may include any number of computing devices of various types and/or capabilities. In some embodiments, computing devices 110, 140, and/or 170 may be any type of computing device including personal computers (e.g., laptop, desktop, smartphone, or tablet computers), servers (e.g., web servers, database servers), network switching devices (e.g. switches, routers, hubs, bridges, and/or the like), vehicle-based devices (e.g., on-board vehicle computers, short-range vehicle communication systems, telematics devices), or mobile communication devices (e.g., mobile phones, portable computing devices, and/or the like), and/or the like, and may include some or all of the elements previously mentioned.

In some embodiments, computing device 110 includes a control unit 120 coupled to memory 130; computing device 140 includes a control unit 150 coupled to memory 160; and computing device 170 includes a control unit 180 coupled to memory 190. Each of control units 120, 150, and/or 180 may control the operation of its respective computing device 110, 140, and/or 170. In some examples, control units 120, 150, and/or 180 may each include one or more processors, central processing units (CPUs), graphical processing units (GPUs), virtual machines, microprocessors, microcontrollers, logic circuits, hardware finite state machines (FSMs), digital signal processors (DSPs) application specific integrated circuits (ASICs), field programmable gate arrays (FPGAs), and/or the like and/or combinations thereof. In some examples, memory 130 may be used to store one or more applications and one or more data structures, such as an application 132 and data structure 134. In some examples, memory 160 may be used to store one or more applications and one or more data structures, such as an application 162 and data structure 164, and memory 190 may be used to store one or more applications and one or more data structures, such as an application 192 and data structure 194.

In some embodiments, memories 130, 160, and/or 190 may each include one or more types of machine-readable media, including volatile and non-volatile memory. Some common forms of machine-readable media may include floppy disk, flexible disk, hard disk, magnetic tape, any other magnetic medium, CD-ROM, any other optical medium, punch cards, paper tape, any other physical medium with patterns of holes, ROM, PROM, EPROM, FLASH-EPROM, any other memory chip or cartridge, and/or any other medium from which a processor or computer is adapted to read. Some common forms of volatile memory include SRAM, DRAM, IRAM, and/or any other type of medium which retains its data while devices are powered, potentially losing the memory when the devices are not powered.

The data structures 134, 164, and/or 194 may vary in size, usage, and/or complexity depending upon the purposes of computing devices 110, 140, and/or 170 and/or applications 132, 162, and/or 192. In some embodiments, when computing devices 110, 140, and/or 170 are network switching devices, such as switches, routers, hubs, bridges, and/or the like, the data structures 134, 164, and/or 194 may include one or more tables with forwarding and/or similar information. In some examples, these tables may include one or more virtual local area network (LAN) tables, link aggregation group (LAG) tables, layer 2 (L2) next hop tables, layer 3 (L3) routing tables, L3 forwarding information bases (FIBs), flow tables, and/or the like. Depending upon the networking environment of system 100 and/or the role of computing devices 110, 140, and/or 170 these tables may include anywhere from a few dozen entries to thousands, or even tens of thousands or more entries. In some examples, data from data structures 134, 164, and/or 194 may be retrieved, stored, or modified by a respective control unit in accordance with instructions which may be executed directly, e.g., machine code, or indirectly, e.g., scripts, by the respective control unit. The systems and methods of the present disclosure are not limited to any particular data structure.

In some embodiments, computing devices 110, 140, and 170 may also be coupled together using a network 101. In some embodiments, one or more of computing devices 110, 140, and 170 may be connected via any type of wired or wireless connections, such as dedicated short-range communications (DSRC), satellite, fire wire, network, USB, Wi-Fi, radio-frequency identification (RFID), BLU-ETOOTH, Near Field Communication (NFC), Infrared (e.g., GSM infrared), and/or the like and/or using any suitable wireless communication standards and protocols, such as IEEE 802.11 and WiMAX. Network 101, including any intervening nodes, may be any kind of network including a local area network (LAN) such as an Ethernet, a wide area network (WAN) such as an internet, a virtual or non-virtual private network, and/or the like and/or combinations thereof.

In some embodiments, network 101 may include any type of computing device including personal computers (e.g., laptop, desktop, smartphone, or tablet computers), servers (e.g., web servers, database servers), network switching devices (e.g. switches, routers, hubs, bridges, and/or the like), vehicle-based devices (e.g., on-board vehicle computers, short-range vehicle communication systems, telematics devices), or mobile communication devices (e.g., mobile phones, portable computing devices, and/or the like), and/or the like, and may include some or all of the elements previously mentioned. Computing devices 110, 140, and 170 through their applications, such as applications 132, 162, and/or 192, may use network 101 to exchange information and/or to provide services for each other. In some examples, computing device 140 may be used to provide backup and/or fail over services for computing device 110. In some examples, computing device 140 may be maintaining data structure 164 as a synchronized copy of data structure 134. In some examples, one or more of components of computing devices 110, 140, and 170, such as a control unit, may be located remotely.

In some embodiments, computing devices 110, 140, and/or 170 may include an electronic display, the display may be an active matrix emitting diode (AMOLED), light-emitting diode (LED), organic LED (OLED), electrophoretic, liquid crystal, e-paper, and/or the like and/or combinations thereof.

In some embodiments, computing devices 110, 140, and/or 170 may include various input and output (I/O) devices, such as a keyboard, a mouse, touchscreen, button inputs, microphone, motion sensor, eye sensor, video display, and/or the like.

Figure 2:
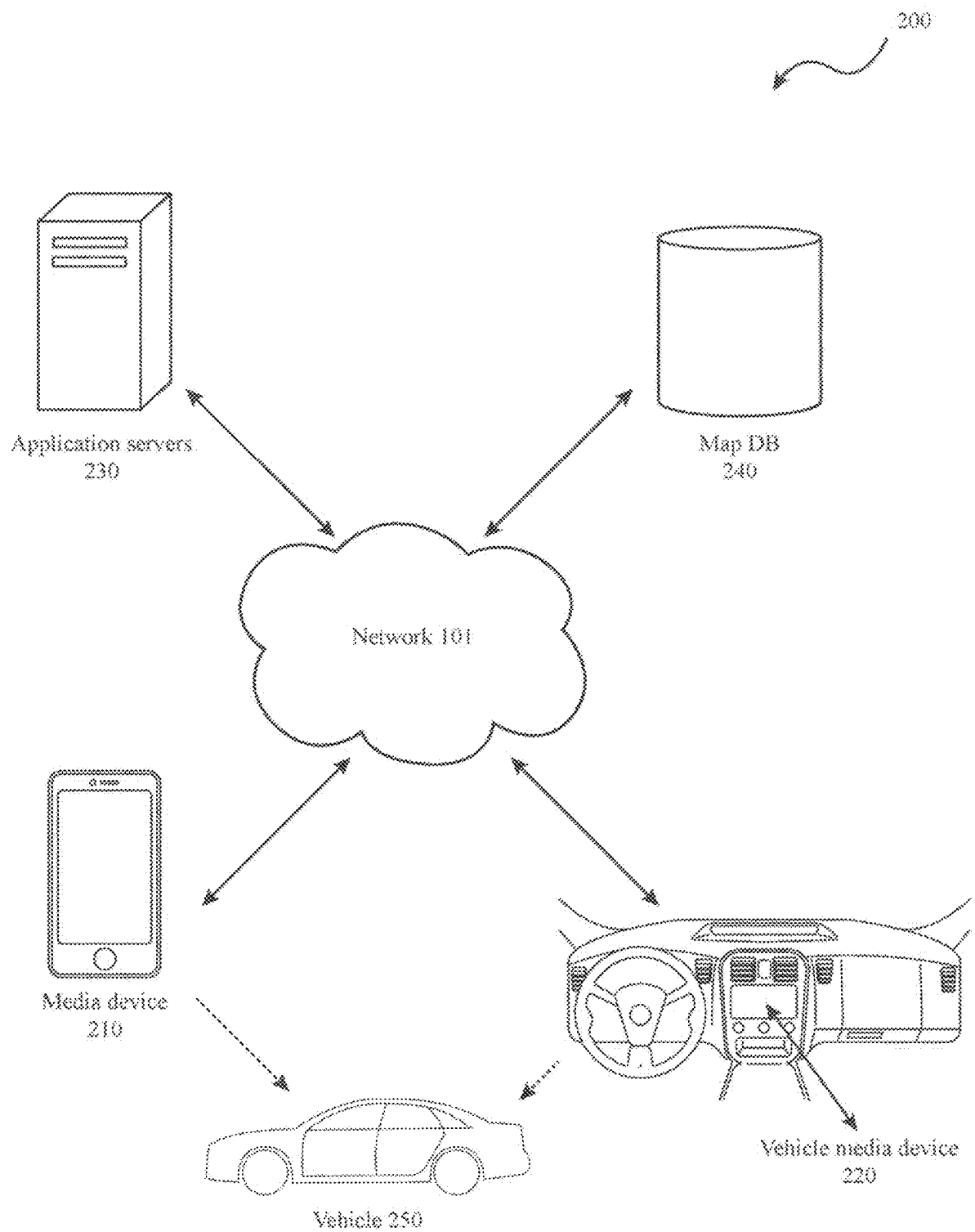
FIG. 2 is an example diagram of a distributed computing network according to some embodiments.

FIG. 2 is a simplified diagram of a distributed computing system 200. In some embodiments, as shown in FIG. 2, system 200 includes media device 210, vehicle media device 220, application servers 230, map database 240, and vehicle 250. In some examples, media device 210 and/or vehicle media device 220 may correspond to one or more of computing devices 110, 140, 170 and may be in communication with one another using network 101.

In some embodiments, vehicle media device 220 may be a device within vehicle 250, or may be part of the vehicle itself, such as an on-board vehicle computer. The vehicle may have more than one computing device. In some examples, vehicle media device 220 may be mounted inside a vehicle, such as to a dashboard of the vehicle. In some examples, the vehicle may be any type of vehicle, including a sedan, truck, SUV, motorcycle, scooter, self-balancing scooters (e.g., a SEGWAY), hoverboard, drone, bus, golf cart, train, trolley, amusement vehicle, recreational vehicle, boat, watercraft, helicopter, airplane, bicycle, and/or the like.

In some embodiments, media device may include a display within a housing. In some examples, the housing may include several parts. In some examples, one part of the housing may include an optically transparent material, such as glass, and another part of the housing may include other materials, such as metallic materials, e.g., aluminum, and/or plastic, which may provide a robust support structure to prevent deformation of the display.

In some embodiments, vehicle media device 220 may establish communication with media device 210, or vice versa. In some examples, media device 210 automatically establishes communication with vehicle media device 220, such as by connections between one or more of computing devices 110, 140, and 170. In some examples, media device 210 is automatically in communication with vehicle media device 220 via wired connection. In some examples, media device 210 may contain its own power supply, or may be powered by a power supply within vehicle 250. In some examples, vehicle may charge media device 210 while in operation. In some examples, media device 210 may be charged wirelessly, e.g., on a wireless charging surface, such as on a dashboard of vehicle 250. Vehicle 250 may contain a transmitter for providing energy transmission and media device 210 may have a receiver for wireless power, whereby energy transfer occurs using magnetic resonant coupling. The transmitter may transmit power using multiple transmit coils and using parallel paths from such coils to multiple receive coils in the receiver.

In some embodiments, vehicle 250 may be remotely controlled, may be partially or totally autonomous, such as partially or totally autonomous vehicle systems and methods disclosed in U.S. Pat. No. 9,330,571, which is incorporated by reference in its entirety. In some examples, vehicle 250 may contain one or more vehicle operation sensors. In some examples, media device 210 and vehicle media device 220 may be included as vehicle operation sensors and may be configured to communicate with the one or more external sensors. External sensors may include cameras, lasers, sonar, radar detection units (e.g., ones used for adaptive cruise control), and/or the like and/or combinations thereof, and may provide data updated in real-time, updating output to reflect current environment conditions. Object detection and classification for autonomous vehicles may be performed according to embodiments disclosed in U.S. Pat. No. 8,195,394, which is incorporated by reference in its entirety.

In some embodiments, data may also be collected from other sources, including one or more application servers 230. In some examples, traffic data may be received by one or more application servers, which may include a geolocation, mapping, and navigation application such as GOOGLE MAPS, APPLE MAPS, WAZE, and/or the like and/or combinations thereof. In some examples, application servers 230 may interact with a map or a geographic information system (GIS) database, such as map database 240, through a map API such as the GOOGLE MAPS API. In some examples, the application servers query the map or GIS database for traffic data in response to receiving the sensor data from the media device and/or host device. In some examples, map database 240 may be an SQL database. The application servers 230 may interface with one or more servers managing the SQL database. Application data and application states may be stored in a cloud managed SQL database. In some examples, map database 240 may be a document-oriented database including a NoSQL database such as a MONGODB database.

Figure 3:
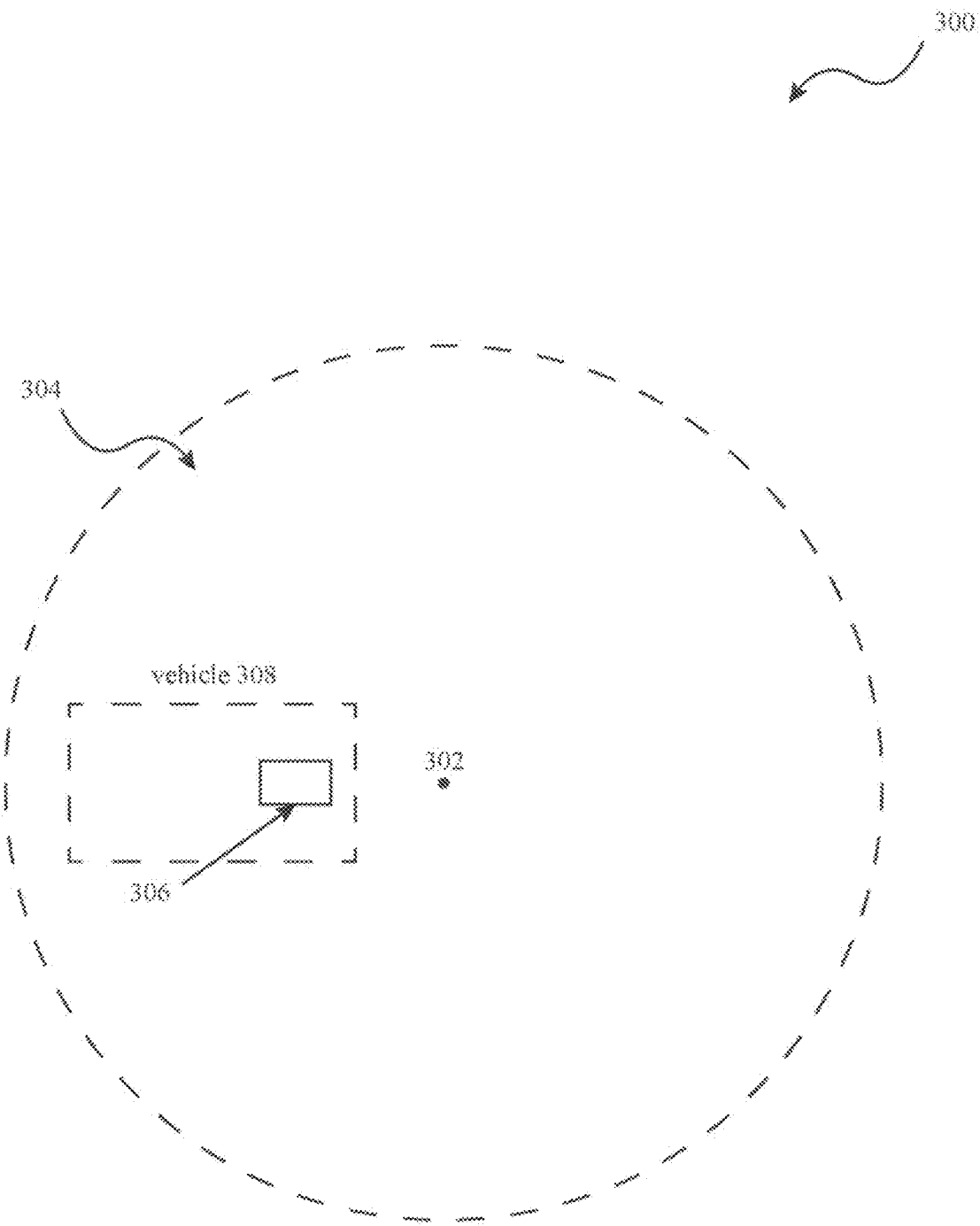
FIG. 3 is an example diagram of a wireless media device detection system, including a geographic area with virtual boundaries.

FIG. 3 is an example diagram of virtual boundaries with a geographic area, which, when a wireless media device enters and/or departs one or more virtual boundaries, it triggers the wireless media device to receive a search request prompt for a listing location. In some examples, a listing location may include any location that is made available (e.g., advertised) on a software application or is associated with a location made available, the location made available includes any real estate that available for temporary licensing, leasing, renting, occupation, and/or the like, including a lot, garage (commercial or residential), and/or other location with a space suitable for occupation, including parking for a vehicle 308. In some examples, vehicle 308 may correspond with vehicle 250.

In some embodiments, a wireless media device 306 may enter and/or depart a geographic area 304. In some examples, wireless media device 306 may correspond to one or more of computing devices 110, 140, 170, media device 210, and/or vehicle media device 220.

In some embodiments, a wireless communication device 302 may transmit signals that include an identifier within the geographic area 304. In some embodiments, geographic area 304 may include a lot, garage, space, and/or any other kind of property, such as one or more listing locations. In some examples, wireless communication device 302 is a broadcast device, such as a beacon or other type of hardware transmitter. In some examples, the bounds of the geographic area 304 may be defined by the signal range associated with wireless communication device 302. In some examples, the signal range is defined by the area in which the strength of the signal exceeds a threshold, such as −40 dBm. In some examples, wireless communication device 302 may correspond to one or more of computing devices 110, 140, 170, media device 210, and/or vehicle media device 220. In some examples, the identifier includes information about wireless communication device 302 and information that may be recognized by a first software application installed on wireless media device 306. In some examples, the identifier may be changed periodically, such as every second; identifiers may be changed for enhanced security. In some examples, the first software application actively monitors signals and compares identifiers included in those signals with those stored in a database. In some examples, signals are encoded or modulated according to predetermined parameters. In some examples, the database may include a cloud managed SQL database, such as a MICROSOFT AZURE database. In some examples, the first software application enables wireless devices to detect wireless communication devices such as beacons in proximity. In some examples, the first software application provides a digital coupon, boarding pass, event ticket, voucher, store card, credit card, loyalty card, debit card, and/or the like and/or combinations thereof that may also be called a pass. In some examples, an amount of a discount may be based on location, such as a specific parking garage, and based on an amount of traveling to such location from a starting location, such as number of miles traveled. In some examples, a digital coupon, such as with an added discount, may be sent in response to a reservation being scheduled from the starting location.

In some aspects, geographic area 304 includes a parking lot, and at the entrance to the parking lot there may be a sign or other physical media that includes a machine-readable, optically-scannable coded image, such as a matrix barcode (e.g., a QR CODE). Wireless media device 306 may scan, photograph, or otherwise capture the image including the coded image. Upon capturing the coded image, wireless media device 306 may recognize the coded image and execute instructions in response to recognizing the coded image. In some examples, wireless media device 306 may recognize the coded image via use of a coded image reader application installed on wireless media device 306. In some examples, instructions are generated using the arrangement of squares, dots, or lines associated with the coded image, such as a matrix barcode, by use of reader application that interprets encoded data of the image. In some examples, the instructions executed cause wireless media device 306 to prompt a pass to be added to the first software application, such as APPLE WALLET. Once the pass is added, wireless media device may be presented with an option to download a second software application, such as a parking application (e.g., PIED PARKER). In some examples, the second software application may already be installed on wireless media device 306 and deliver a notification to the user prompting them to save a new pass to their device or open an existing one. In some examples, at the entrance to the parking lot there is a kiosk or other fixed device that uses a short-range wireless technology, such as near-field communication (NFC), BLUETOOTH low energy (BLE) and/or the like, which, when in proximity or direct contact with wireless media device 306, causes wireless media device 306 to prompt a pass to be added via the first software application. In some examples, the fixed device includes an NFC reader, RFID tag reader, a facial recognition device, retina scanner, a fingerprint reader, barcode scanner, and/or the like and/or combinations thereof.

In some embodiments, the pass may be added when an identifier associated with wireless communication device 302 is recognized. In some examples, the pass is mapped to a unique identifier of wireless communication device 302 and the coded image, and the pass is only added when the unique identifiers match. Requiring a matching of the two identifiers may function as a method of verification that wireless media device 306 is physically present in the geographic area 304, and wireless media device 306 is not simply acquiring a pass through the capturing of the image including the coded image. In other words, the verification is dual factored: one factor being the unique identifier associated with the captured image and the other from the unique identifier sent by wireless communication device 302.

In some embodiments, when an identifier is recognized, a corresponding message is prompted on the wireless media device 306. In some examples, the corresponding message is a notification, alert, update, text message, chime, and/or the like, on wireless media device 306. In some examples, the corresponding message presents a pass when a second software application, such as a parking application (e.g., PIED PARKER), is not installed on wireless media device 306. In some examples, the corresponding message is a notification from the second software application such as a parking application (e.g., PIED PARKER), installed on wireless media device 306. In some examples, the corresponding message includes a request to search for a listing location. In some examples, the corresponding message includes a link. In some examples, the link is a deep link, such as a uniform resource identifier (URI) that launches a resource within a second software application. A deep link enables wireless media device 306 to launch a second software application to a relevant portion within the second application without having to separately launch the second software application and navigate to that relevant portion. In some examples, the deep link is a deferred (AKA persistent) deep link, such that it routes wireless media device 306 to content even if the second software application is not installed when the link is activated; via the deferred deep link, wireless media device 306 is redirected to an application store, such as GOOGLE PLAY or the APP STORE, to allow for download and/or installation of the linked-to application, and then, upon completion of the download and/or installation, launches the second software application and navigates to the relevant portion. Some advantages of disclosed embodiments include the ability of an operator of wireless media device 306 to have a pass prompted to be added to their phone, giving them the opportunity to wait until they park to download the second software application and/or transmit the search request. This allows for the operator to avoid having to complete the transaction while at the gate or while driving and looking for a parking space; the operator may simply wait until the operator is safely stopped to complete the transaction, which may result in reduced traffic, less accidents, simplification of user experience, and faster processing of transactions. In some examples, the operator of wireless media device 306 may cause the second software application to be downloaded and/or routed to content within the second software application using short-range wireless technology, such as NFC. In some examples, the wireless media device 306 in response to NFC proximity and/or contact, prepares a search request including payment information, the search request being completed with little to no input from the operator, such as requesting confirmation of payment from the operator.

In some embodiments, a second software application, such as PIED PARKER, may already be downloaded on wireless media device 306. In some examples, when the second software application is already downloaded, the second software application may generate one or more search request parameters automatically, and a search request may be generated. In some examples, only one software application is required. In some examples, search request parameters are associated with listing locations, parameters including, but not limited to, preset information or data concerning listing locations previously requested by wireless media device 306, a time of entering the search request, a proximity to the physical location of wireless media device 306, an availability time, temporal duration of reservation period, time remaining for availability, a type of listing location, such as whether the listing location may accommodate motorcycles, trucks, compact vehicles, and/or the like; a price range for a listing location, dimensions associated with listing locations, whether or not the listing location has an over-head cover, whether or not the listing location is an electric vehicle (EV) charging station, whether or not the listing location provides gas-filling services, a user rating associated with the listing location, such as a one to five star rating, a unique identifier associated with a parking space or parking lot, and/or the like and/or a combination thereof. Some advantages of disclosed embodiments include the auto-generation of search requests for listing locations, with little to no input from a user. In some examples, a driver with a smartphone enters a parking garage and receives a notification prompting the driver to book and reserve a parking space; all of the information about the driver's preferences, such as preferences for compact vs. large parking spaces, EV charging stations, and temporal duration may be inputted into a search request automatically. In some examples, the driver's preferences may be integrated with one or more calendar APIs, such that meetings or other events with a temporal duration tied to a location may be identified. In some examples, the search request may be sent once network data is available to the driver's smartphone, and the driver subsequently completes the reservation of the parking space before returning to the parking garage. In some examples, a confirmation identifier may be sent to the driver's smartphone as a receipt, which may be shown/scanned in order to enter or exit the garage. In some aspects, opening a message containing the confirmation identifier may be sufficient to allow a user to enter and/or exit, with or without a prompt. In some aspects, preferences may be set by users to enforce a confirmation from wireless media device 306.

In some embodiments, geofencing may be used to determine when wireless media device 306 enters or leaves geographic area 304 by means of a predetermined virtual geographic boundary that includes geographic area 304. In some examples, geographic area 304 may be a home, office location, one or more commercial parking lots, an area surrounding one or more parking lots; and/or the like. In some examples, geographic area 304 is non-circular, and may be rectangular, oval, square, triangular, trapezoidal, a polygon, and/or the like and/or any other shape. In some examples, a message may be sent in response to determining wireless media device 306 has entered or left geographic area 304 based on location data associated with wireless media device 306.

In some examples, the determination of whether wireless media device 306 has entered or departed geographic area 304 and/or whether a search request prompt should be sent is performed using a machine learning (ML) model that may be trained/tuned based on training data collected from positive recognition, false recognition, and/or other criteria. Although various types of machine learning models may be deployed to refine some aspects for identifying whether a search request prompt should be sent, in some aspects, one or more ML based classification algorithms may be used. Such classifiers may include but are not limited to: a Multinomial Naive Bayes classifier, a Bernoulli Naive Bayes classifier, a Perceptron classifier, a Stochastic Gradient Descent (SGD) Classifier, and/or a Passive Aggressive Classifier, and/or the like. Additionally, the ML models may be configured to perform various types of regression, for example, using one or more various regression algorithms, including but not limited to: a Stochastic Gradient Descent Regressor, and/or a Passive Aggressive Regressor, etc. In some examples, a virtual boundary including geographic area 304 may be dynamically adjusted using systems and methods described in U.S. Pat. No. 9,349,104, which is incorporated by reference in its entirety.

In some examples, the virtual boundary may be dynamically adjusted based on machine learning using data associated with a mesh network, data including listing location data, such as GPS coordinates, wireless media device location data, wireless media device location data and time, and telemetric data between wireless media device 306 and one or more beacons. The mesh network may give the virtual boundary in the form of a three-dimensional coordinate system.

In some aspects, the virtual boundary data is enhanced with navigational mappings, such as the location of the entrance and exit on the boundary, the location of the parking spaces in relation to the boundary, the indoor routing within the geographic area, such as the indicated direction vehicles are meant to travel or detours, and/or the like.

In some embodiments, wireless communication device 302 is a plurality of one or more devices, and the plurality of one or more devices and/or wireless media device 306 are part of a mesh network. In some examples, wireless media device 306 connects to one or more nodes of the mesh network, including one or more devices associated with geographic area 304. In some examples, the plurality of one or more devices may include, but are not limited to, a Wi-Fi modem, GPS, RFID, a BLUETOOTH component, which may include, smart devices, a vehicle or vehicle media device, such as vehicle media device 220; and/or the like; a hotspot tether, a 3G or 4G modem, an LTE modem, a parking sensor, such as object detection sensors discussed above with respect to FIG. 2, and/or the like and/or combinations thereof.

Some advantages of disclosed embodiments include the ability of the operator of wireless media device 306 to delay completion of the transaction until returning to the geographic area 304. For instance, an operator may return to geographic area 304, and upon verification that operator has entered geographic area 304, a notification may be prompted that reminds the operator to complete the payment transaction before departing geographic area 304, such as in a parking lot with a gate arm that only lifts upon verification of payment. Some advantages of disclosed embodiments include the increased accuracy of verifying when a wireless media device has entered or departed a geographic area, and in some examples this verification may require limited use to no use of GPS or outside data networks (e.g., networks other than the mesh network). More specifically, in some parking garages, access to data networks may be limited because parking garages are often underground or are surrounded by thick walls of concrete. In some examples, the physical presence of wireless media device 306 may be verified without the use of GPS or data networks.

Figure 4:
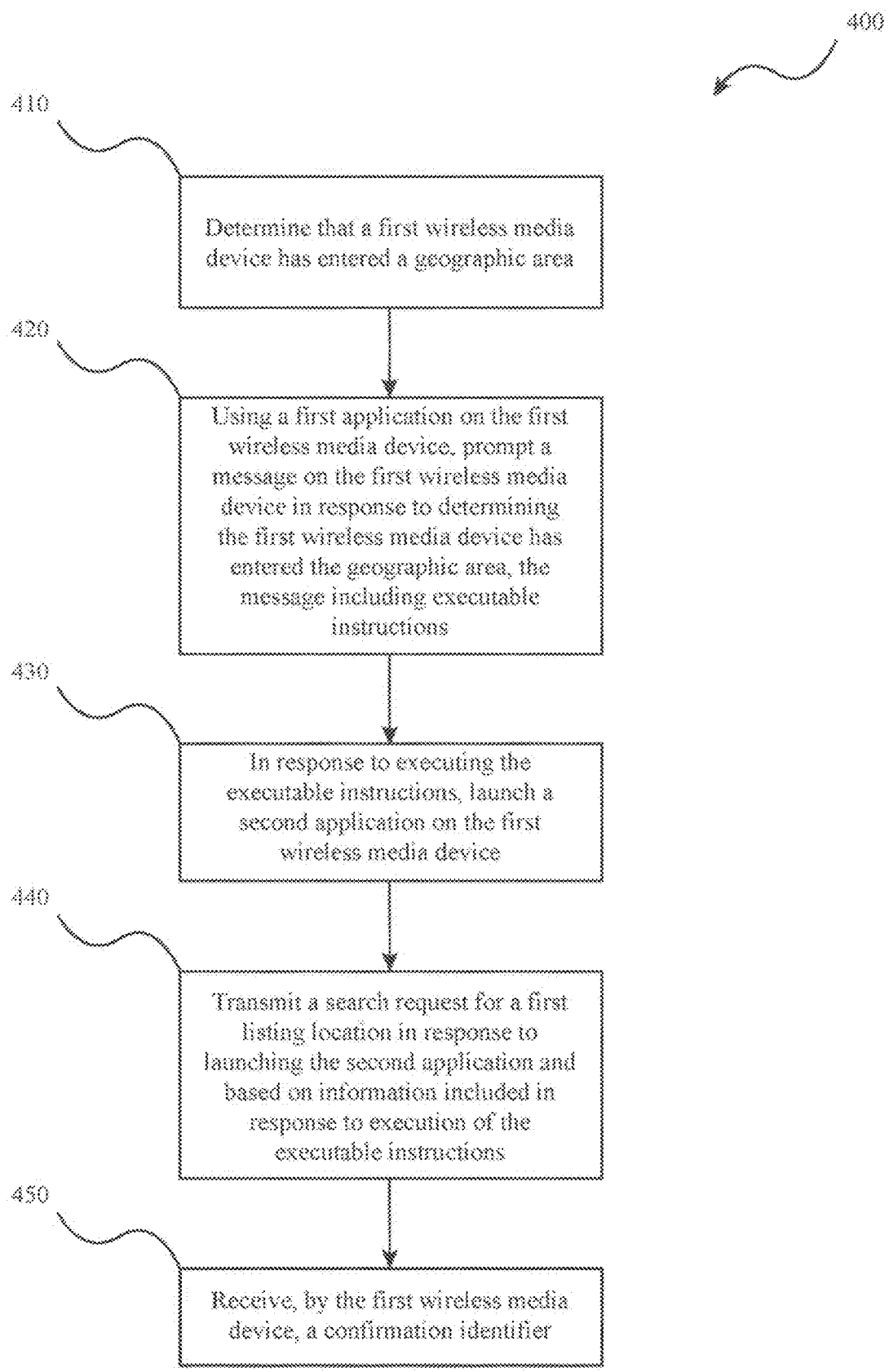
FIG. 4 is a flowchart illustrating an example method for prompting a message using a first software application installed on a first wireless media device upon detection the first wireless media device has entered a geographic area, the message including an embedded search request for a listing location.

FIG. 4 is a flowchart illustrating an example method 400 for prompting a message using a first software application installed on a first wireless media device upon detection the first wireless media device has entered a geographic area, the message including a search request prompt for reserving a listing location. Method 400 is illustrated in FIG. 4 as a set of processes 410-450. In some examples, processes 410-450 may be implemented on one or more application servers, such as application servers 230. In some examples, not all of the illustrated processes may be performed in all embodiments of method 400. Additionally, one or more processes not expressly illustrated in FIG. 4 may be included before, after, in between, or as part of processes 410-450. In some embodiments, one or more processes 410-450 may be implemented, at least in part, in the form of executable code stored on non-transitory, tangible, computer readable media that when run by one or more processors (e.g., a processor of the media device) may cause the one or more processors to perform one or more of processes 410-450. In some examples, the first wireless media device may correspond to one or more of computing devices 110, 140, 170, media device 210, and/or vehicle media device 220, one or more sensors may include those sensors discussed above with respect to FIG. 2, and wireless communication device 306. In some examples, the geographic area corresponds to geographic area 304.

During a process 410, it may be determined that a first wireless media device has entered the geographic area. In some examples, the determination may be performed by one or more application servers monitoring location data and sensor data associated with the wireless media device and/or using geofencing, as discussed above with respect to FIG. 3. In some examples, the determination may be performed by the first wireless media device, using methods above with respect to FIG. 3.

During a process 420, using a first software application on the first wireless media device, a message may be prompted on the first wireless media device in response to determining the first wireless media device has entered the geographic area, the message including executable instructions. In some examples, the message includes a link, such as a deep link as discussed above with respect to FIG. 3.

During a process 430, in response to executing the executable instructions, a second software application is launched on the first wireless media device. The second software application may correspond to the second software application discussed above with respect to FIG. 3. In some examples, the first application and the second application are aspects of the same application whereby they both communicate with wireless communication device 306 to deliver a prompt to the user.

During a process 440, a search request may be transmitted in response to launching the second application and executing the executable instructions, the search request including search request parameters as discussed above with respect to FIG. 3 based on the executing of the executable instructions.

During a process 450, a confirmation identifier may be received by the first wireless media device. In some examples, the confirmation identifier is transmitted from one or more application servers. In some examples, a confirmation identifier includes a coded image, such as a barcode, a pass key, a unique password comprised of alphanumeric characters, an encrypted signal or key, and/or the like and/or a combination thereof. In some examples, the confirmation identifier prompts the first wireless media device to transmit a signal, such as methods discussed above with respect to FIG. 3. In some examples, the confirmation identifier may be manually displayed to a toll booth operator. In some examples, a toll booth operator may use a scanner to scan a coded image displayed on the first wireless media device including the confirmation identifier. In some examples, a wireless receiver may be configured to receive the signal, such as the fixed device discussed above with respect to FIG. 3.

Figure 5:
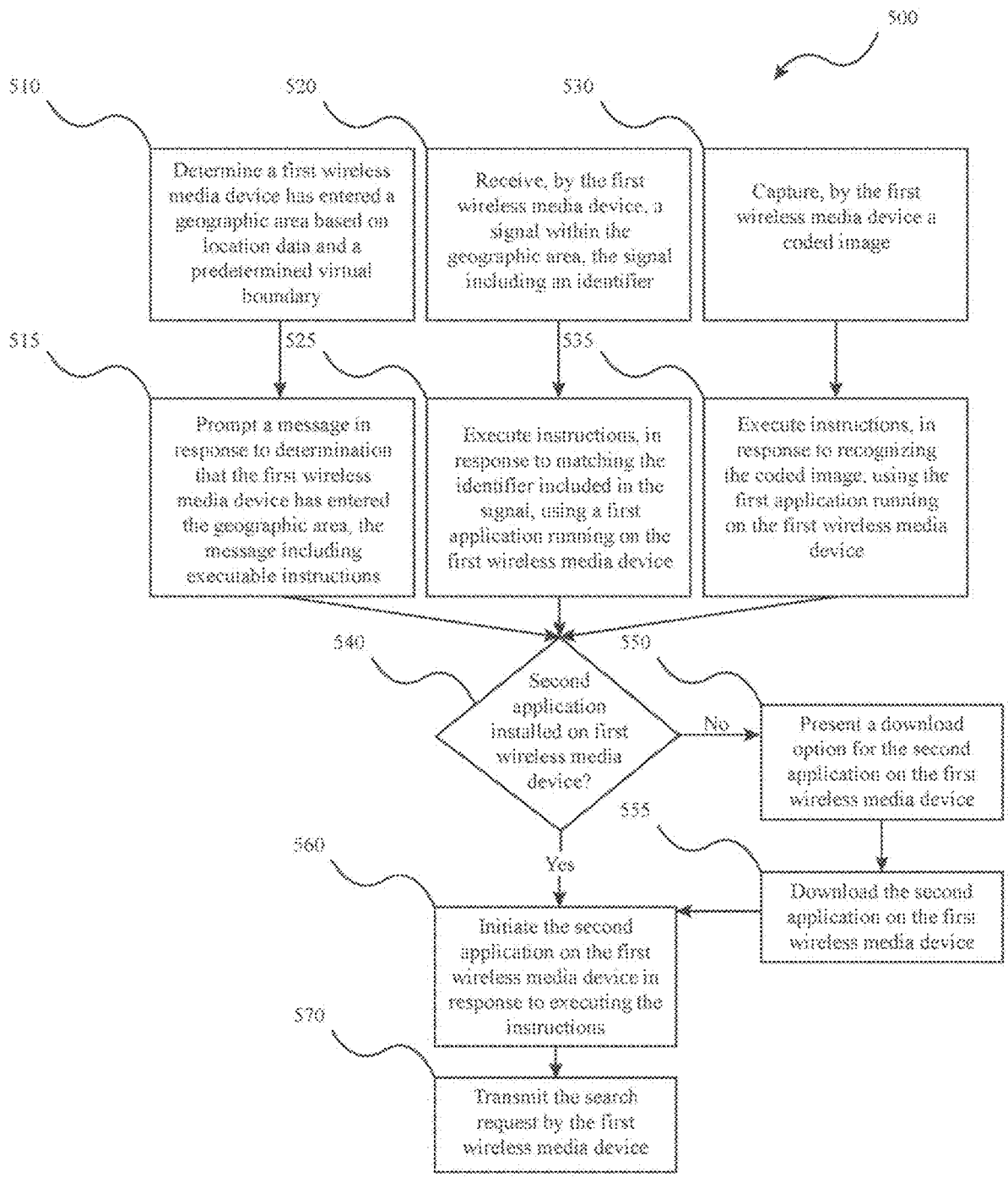
FIG. 5 is a flowchart illustrating an example method for prompting a message including a search request for a listing location when a first wireless media device enters a geographic area and initiating a second software application on the first wireless media device to transmit the search request.

FIG. 5 is a flowchart illustrating an example method 500 for prompting a message including a search request prompt for a listing location when a first wireless media device enters a geographic area and initiating a second application on the first wireless media device to transmit a search request prompt. Method 500 is illustrated in FIG. 5 as a set of processes 510-570. In some examples, processes 510-570 may be implemented on one or more application servers, such as application servers 230. In some examples, not all of the illustrated processes may be performed in all embodiments of method 500. Additionally, one or more processes not expressly illustrated in FIG. 5 may be included before, after, in between, or as part of processes 510-570. In some embodiments, one or more processes 510-570 may be implemented, at least in part, in the form of executable code stored on non-transitory, tangible, computer readable media that when run by one or more processors (e.g., a processor of the media device) may cause the one or more processors to perform one or more of processes 510-570.

In some examples, the first wireless media device may correspond to one or more of computing devices 110, 140, 170, media device 210, and/or vehicle media device 220, one or more sensors may include those sensors discussed above with respect to FIG. 2, and wireless media device 306. In some examples, the geographic area corresponds to geographic area 304.

During a process 510, it may be determined that a first wireless media device has entered (or departed) a geographic area based on location data and a predetermined virtual boundary, as discussed above with respect to FIG. 3. In some examples, the first wireless media device determines that it has entered the geographic area based on location data.

During a process 515, the first wireless media device prompts a message in response to the determination that the first wireless media device has entered (or departed) the geographic area as discussed above with respect to FIG. 3, the message including executable instructions. In some examples, the message includes a link, such as a deep link as discussed above with respect to FIG. 3.

During a process 520, the first wireless media device receives a signal within the geographic area, the signal including an identifier. In some examples, the signal is transmitted by a wireless communication device and the identifier is associated with the wireless communication device. In some examples, the wireless communication device corresponds to the fixed device discussed above with respect to FIG. 3. In some examples, the wireless communication device may correspond to wireless communication device 302. In some examples, the first wireless media device runs the first software application as discussed above with respect to FIG. 3.

During a process 525, instructions are executed in response to matching the identifier using the first software application running on the first wireless media device. In some examples, a pass is added to the first software application in response to the matching, as discussed above with respect to FIG. 3.

During a process 530, a coded image is captured by the first wireless media device. In some examples, the coded image corresponds with the coded image discussed above with respect to FIG. 3. In some examples, the wireless media device may scan, photograph, or otherwise capture the image including the coded image.

During a process 535, instructions are executed by the first wireless media device in response to a first software application recognizing the coded image. In some examples, the instructions executed cause the first wireless media device to present a pass to be added to the first software application, such as APPLE WALLET.

In some embodiments, processes 510-515, 520-525, and 530-535 operate independently from one other. In some examples, one or more of processes 510-515, 520-525, and 530-535 are mutually exclusive with respect to operation of one another. In some examples, processes 510-515, 520-525, and 530-535 may operate simultaneously. In some examples, a pass is only added to the first software application in response to dual factor verification, such as matching identifiers by one or more one wireless communication devices and/or identifiers associated with one or more captured images.

During a process 540, in response to executing instructions, it is determined whether the second application is installed on the first wireless media device.

During a process 550, when it is determined that the second application is not installed on the first wireless media device, a download option of the second application is presented. In some examples, the download option is in the form of a message that includes a link, such as the deep link discussed above with respect to FIG. 3. In some examples, a pass is added to the first software application in response to matching a unique identifier associated with the wireless communication device and the coded image, and determining that the second application is not installed on the first wireless media device.

During a process 555, the second application is downloaded on the first wireless media device in response to the download option being selected. In some examples, the second application is downloaded from an application store such as GOOGLE PLAY or the APP STORE. In some examples, the second application is downloaded with or without user input.

During a process 560, a second application is initiated on the first wireless media device in response to executing the instructions. In some examples, the second application is opened and routed to content within the second application. In some examples, a search request is generated, and one or more parameters are included with little or no user input. In some examples, parameters include search request parameters associated with listing locations, parameters including, but not limited to, preset information or data concerning listing locations previously requested by the first wireless media device, a time of entering the search request, a proximity to the physical location of the first wireless media device, an availability time, temporal duration of reservation period, a type of listing location, a price range for a listing location, dimensions associated with listing locations, whether or not the listing location has an over-head cover, whether or not the listing location is an electric vehicle (EV) charging station, whether or not the listing location provides gas-filling services, a user rating associated with the listing location, such as a one to five star rating, a unique identifier associated with a parking space or parking lot, and/or the like and/or a combination thereof. In some examples, the first application and the second application are aspects of the same application whereby they both communicate with wireless communication device 306 to deliver a prompt to the user.

During a process 570, the search request is transmitted by the first wireless media device. In some examples, the search request is transmitted to one or more application servers coupled to a database of listing locations. In some examples, a confirmation identifier may be received by the first wireless media device in response to the search request.

In some embodiments, transmission of the search request by the first wireless media device is delayed, i.e., the search request is stored on the first wireless media device and transmitted at a later time. In some examples, the transmission of the search request is delayed until wireless media device is able to access a network, such as network 101.

Some advantages of disclosed embodiments include completing a transaction for reserving a listing location with little to no user input. In some examples, using a smartphone, a user may complete hands-free payment of parking fees or receive parking voucher verification. The smartphone may receive a notification once it is close to a parking lot. The notification may include pricing and hours information, and give the smartphone user the option, for instance, to simply use voice commands to trigger the parking space search request on the smartphone. Using pre-entered payment information, and information about location, the smartphone may complete the transaction by confirming with the smartphone user whether or not to park at a location. Some advantages also include reduced traffic, reduced processing time, and increased user acquisition, potentially from offering promotional rates for downloading parking application and booking a parking space through a parking application.

In some embodiments, a confirmation identifier may be received by the first wireless media device in response to the search request. In some examples, the confirmation identifier may correspond to the confirmation identifier discussed above with respect to FIG. 4. Some advantages of disclosed embodiments include avoiding the use of printing vouchers, tickets, or parking lot personnel. The voucher may be stored on the phone and presented when verifying payment, such as when the vehicle operator is at exit of a parking lot. Some advantages of disclosed embodiments include not just saving paper or man-hours, but hands-free payment verification, such as to diminish or eliminate altogether the need for actual user input.

Figure 6:
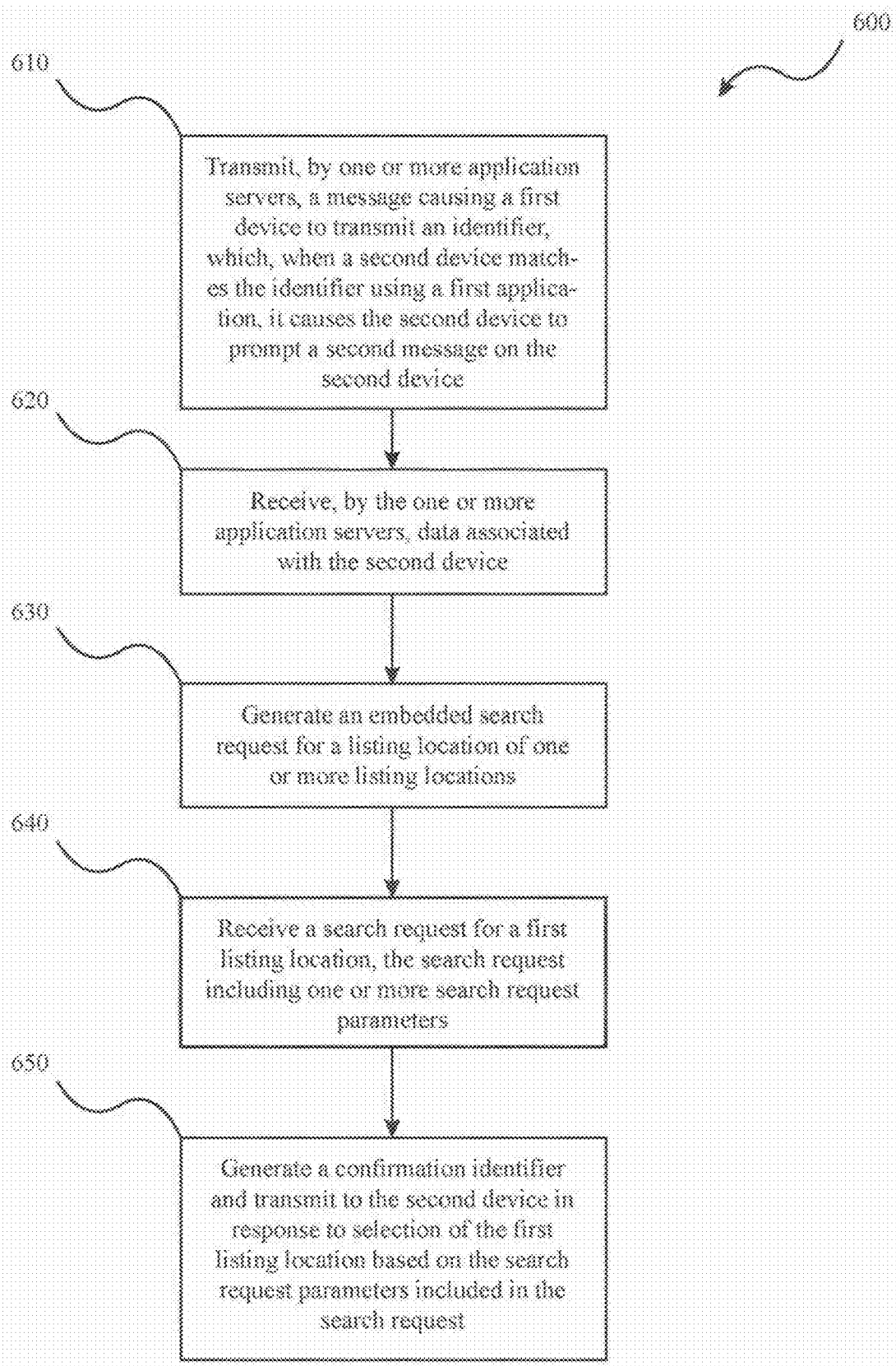
FIG. 6 is a flowchart illustrating an example method for transmitting a message that causes a first wireless media device to transmit a search request for a listing location when a first wireless media device enters a geographic area.

FIG. 6 is a flowchart illustrating an example method 600 for transmitting a message that causes a first wireless media device to transmit a search request for a listing location when a first wireless media device enters a geographic area. Method 600 is illustrated in FIG. 6 as a set of processes 610-650. In some examples, processes 610-650 may be implemented on one or more application servers, such as application servers 230. In some examples, not all of the illustrated processes may be performed in all embodiments of method 600. Additionally, one or more processes not expressly illustrated in FIG. 6 may be included before, after, in between, or as part of processes 610-650. In some embodiments, one or more processes 610-650 may be implemented, at least in part, in the form of executable code stored on non-transitory, tangible, computer readable media that when run by one or more processors (e.g., a processor of the media device) may cause the one or more processors to perform one or more of processes 610-650.

During a process 610, a message is transmitted by one or more application servers. In some examples, the message causes a first device to transmit a second message including an identifier. In some examples, the first device may correspond to one or more of computing devices 110, 140, 170, media device 210, and/or vehicle media device 220, one or more sensors may include those sensors discussed above with respect to FIG. 2, and wireless communication device 306. In some examples, the identifier may correspond to the identifier discussed above with respect to FIG. 3. In some examples, the identifier may be recognized by a second device in the manner discussed above with respect to FIG. 3 and FIG. 5, and the second device may correspond with wireless media device 306. In some examples, when the second identifier is recognized by the second device, a third message is prompted on the second device, the third message including executable instructions as discussed above with respect to FIGS. 4-5.

During a process 620, data is received by the one or more application servers, the data being associated with a first software application on the second device, including data associated with the second device. In some examples, the data associated with the second device includes data associated with the first software application, location data, the identifier associated with the first device, parameters associated with listing locations, preset information or data concerning listing locations previously requested by the second device, a time of entering the search request, a proximity to the physical location of the second device, a destination of the second device (such as one destination entered into the first software application), an availability time, a type of listing location, a price range for a listing location, dimensions associated with listing locations, whether or not the listing location has an over-head cover, whether or not the listing location is an electric vehicle (EV) charging station, whether or not the listing location provides gas-filling services, a user rating associated with the listing location, such as a one to five star rating, a unique identifier associated with a parking space or parking lot, and/or the like and/or a combination thereof. In some examples, the data sent from the second device includes location data; the one or more application servers searches a database of listing locations and determines closest listing locations. In some examples, the data sent from the second device includes pricing information, location data, and destination data; the one or more application servers searches a database of listing locations and finds the cheapest listing locations proximate to the location and/or destination of the second device. In some examples, a device is proximate when the distance is less than a threshold number of miles, such as less than 0.25-5 miles.

During a process 630, an embedded search request for a listing location of one or more listing locations is generated by the one or more application servers. In some examples, the embedded search request is a message that includes executable instructions, which, when executed by the second device, prompt the third message on the second device. In some examples, this message includes a link, such as the deep link discussed above with respect to FIG. 3.

Some advantages of disclosed embodiments include transmission of an embedded search request for a listing location to the second device, when a vehicle and/or vehicle operator is searching for parking, and a first user device is likely to respond with an affirmative request for a listing location. In some examples, a vehicle and/or vehicle operator is looking for parking proximate to a parking lot, parking garage, or residential area, etc. The vehicle and/or vehicle operator may have a destination and need parking close to that destination. For several blocks, the vehicle and/or vehicle operator may circle the blocks, driving further away from the destination in search of parking. In some examples, based on determining the second device has entered a geographic area, such as using methods 300, 400, and 500, a vehicle and/or vehicle operator may be transmitted an embedded search request when they are likely to be looking for parking close to a place where parking is available. Some advantages of disclosed embodiments may include reduced traffic, reduced accidents, diminishing or eliminating the need for vehicle operator input, and faster processing of parking transactions.

During a process 640, a search request for a first listing location is received, the search request including one or more search request parameters, such as parameters discussed above with respect to FIG. 5. In some examples, the one or more application servers may receive the search request and, in response to the search request, determine one or more listing locations that match the one or more search request parameters, the one or more listing locations being stored in one or more databases.

During a process 650, a confirmation identifier is generated and transmitted to the second device in response to selection of a first listing location based on search request parameters included in the search request. In some examples, the confirmation identifier corresponds to the confirmation identifier discussed above with respect to FIGS. 3-4.

Figure 7:
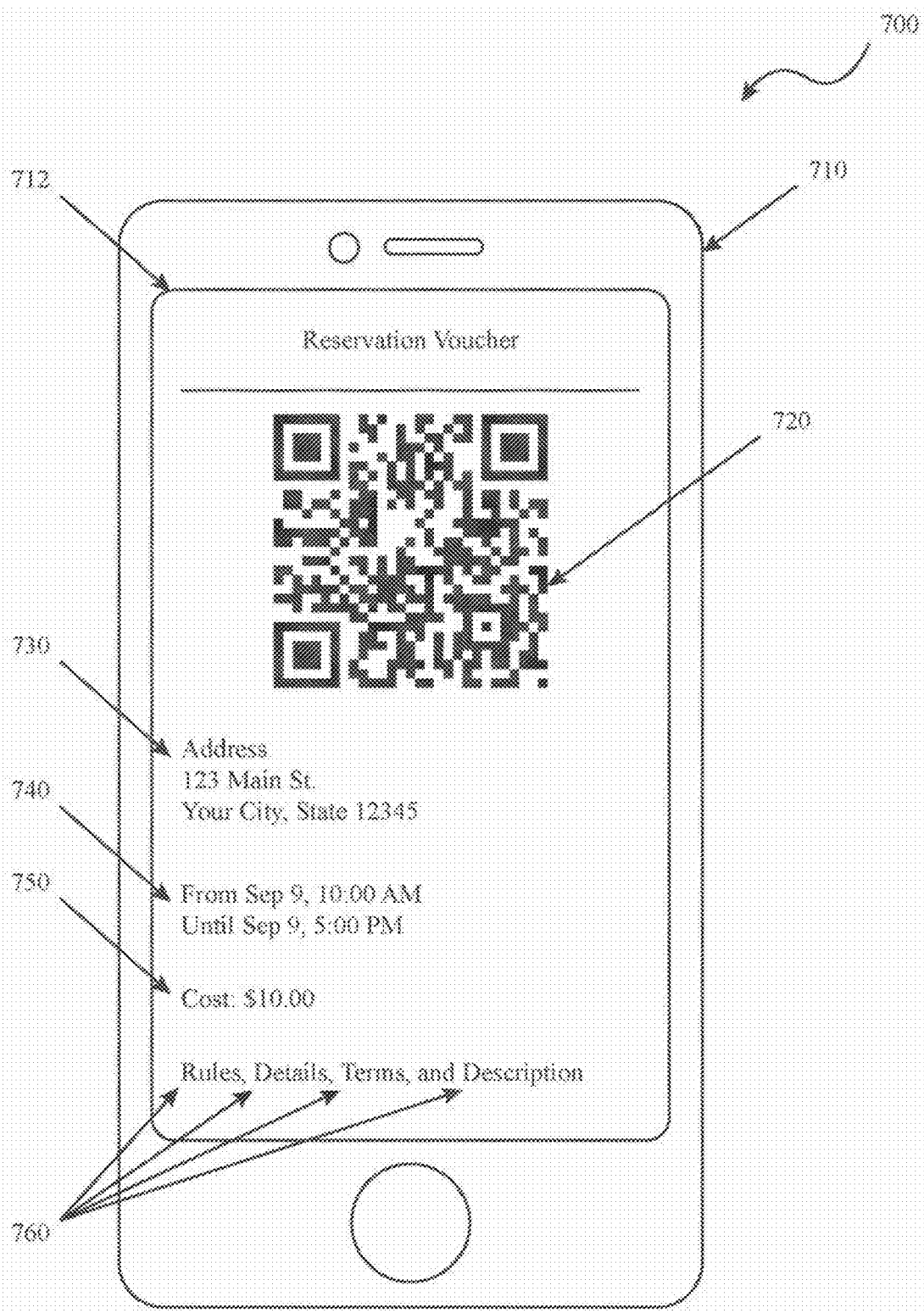
FIG. 7 is an example system for presenting a voucher displayed on a wireless media device.

FIG. 7 is an example system 700 for presenting a voucher displayed on a wireless media device 710, which may correspond to one or more of computing devices 110, 140, 170, media device 210, vehicle media device 220, and may perform methods 400. In some examples, wireless media device 710 includes a display 712, which may display a graphical user interface (GUI). In some examples, display 712 corresponds with the electronic display discussed above with respect to FIG. 1.

In some embodiments, display 712 features a GUI that includes a voucher with GUI objects. In some examples, one or more GUI objects may include hyperlinks, which, when activated, launch a second window or application on wireless media device 710.

In some embodiments, display 712 includes GUI objects including coded image 720, location information 730, reservation period 740, price 750, and miscellaneous objects 760. In some examples, coded image 720 corresponds with the coded image discussed above with respect to FIG. 3. In some examples, coded image 720 is a QR code, such that it includes a confirmation identifier, corresponding to the confirmation identifier discussed above with respect to FIGS. 3-4, and is coded to include information related to reservation of a listing location, e.g., reservation times, location information associated with the listing location, pricing information, payment information, such as a credit card number, license plate number associated with a vehicle, and/or the like and/or combinations thereof. In some examples, location information 730 includes an address, longitude/latitude information, and other information that may be specific to one or more listing locations. In some examples, reservation period 740 includes information about times in which the listing location has been reserved, such as a date, time of day, year, and/or the like and/or combinations thereof. In some examples, reservation period 740 includes information related to a closing time of a parking lot. In some examples, price 750 includes an amount of currency paid for a listing location reservation, including an amount in dollars. In some examples, miscellaneous objects 760 include Rules, Details, Terms, and Description, which include links to additional information regarding the reserved listing location. In some examples, rules may include rules associated with conduct to be expected or permitted at the listing location, such as parking within certain areas or in areas with certain designations. In some examples, details may include additional information about an area associated with a listing location, such as stores available at a mall, bands at a concert hall, sports teams at a stadium, and/or the like. In some examples, terms may include a terms and conditions agreement. In some examples, description may include information about the listing location, such as a number of a parking spot or level in a parking garage.

Figure 8:
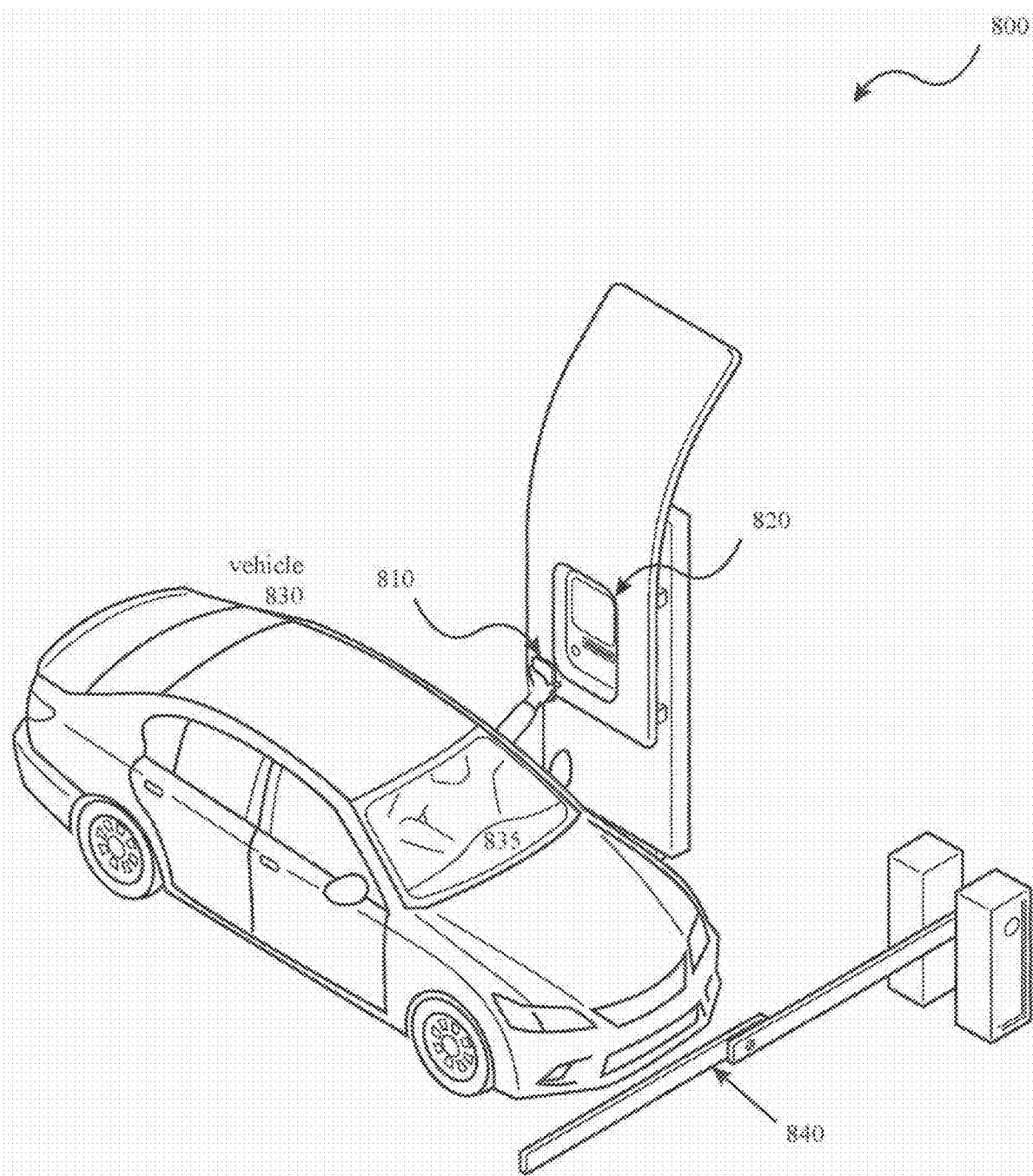
FIG. 8 is an example system for automatic verification of payment via a wireless media device.

FIG. 8 is an example system 800 for unlocking a secure area or access barrier using a wireless device. In some examples, a vehicle 830 arrives at or near a listing location, the vehicle including wireless media device 810 and/or on-board vehicle device 835. In some examples, a wireless communication device 820 may be configured to scan or receive signals from wireless media device 810 and/or on-board vehicle device 835, and subsequently unlock a secure area within a parking garage. In some aspects, a driver of vehicle 830 may hold out the wireless media device 810 in order for wireless communication device 820 to detect signals from wireless media device 810. In some aspects, the wireless media device 810 may communicate with wireless communication device 820 without requiring closer contact of wireless media device 810. In some examples, in response to matching a unique identifier associated with the signals from wireless media device 810 and/or on-board vehicle device 835, gate 840 may raise and allow vehicle 830 to enter or exit. In some examples, wireless communication device 820 may store a database of unique identifiers, and match the unique identifier sent from wireless media device 810 with one stored in the database. In some examples, the database is stored on one or more application servers, and wireless communication device 820 may transmit a verification query to the one or more application servers to determine whether the transmitted unique identifier matches any stored unique identifier in the database. In response to matching the transmitted unique identifier with one stored, the one or more application servers may send a verification confirmation message. In response to the verification confirmation message, then the secure area may become unlocked.

In some embodiments, verification of wireless device 810 may require additional criteria. In some aspects, a license plate of vehicle 830 may be scanned, manual recognition of a code may be required, and/or the like. Some advantages of disclosed aspects include additional security and accountability, such as by means of more than one method of verification. In some aspects, a thief may have stolen a phone and wishes to use the phone to exit the garage. The license plate verification would prevent the use of the phone to exit the garage, possibly preventing a quick escape of the thief.

Some advantages of disclosed embodiments include automatic verification of payment via a wireless media device. A smartphone user for instance may pay for parking using the smartphone and simply provide verification by holding up the smartphone to a device equipped to scan or receive signals. The smartphone may display a QR code, for example, as shown in FIG. 7, and an optical scanner may be configured to scan the QR code and use the coded image to verify payment. The smartphone may also use short-range wireless communication technology, and the verification may occur using NFC, the identifier being transferred from the smartphone to the device equipped to receive the short-range wireless signals. This enables faster processing of parking transactions, ensures more accurate payment systems, decreases accidents and provides additional safety of vehicles entering and exiting parking lots, improves customer experience and provides additional contextualization about parking experiences particular to certain users.

Figure 9:
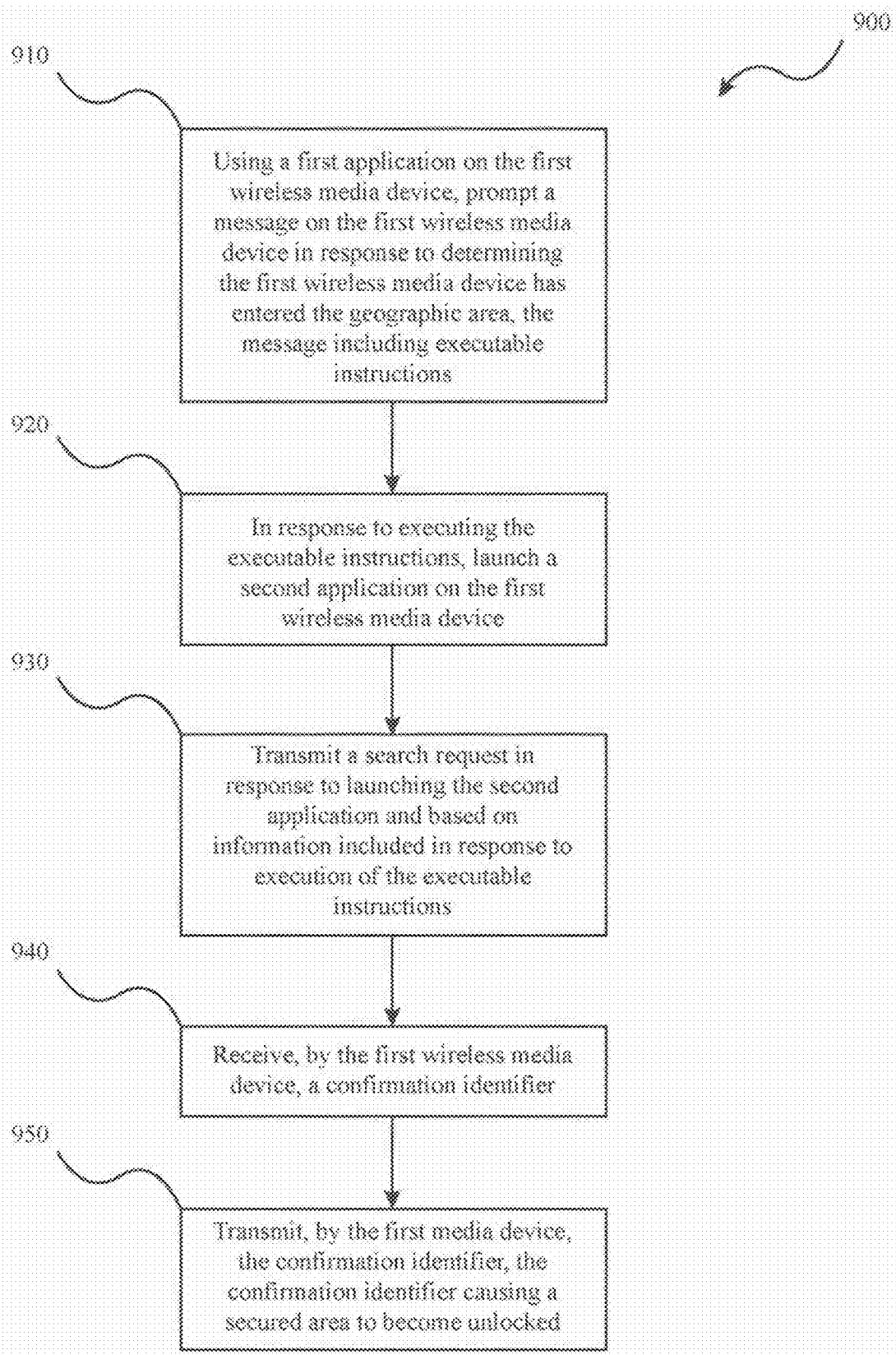
FIG. 9 is another example view of a voucher displayed on a wireless media device.

FIG. 9 is a flowchart illustrating an example method 900 for transmitting a search request for a listing location when a first wireless media device enters a geographic area, and subsequently unlocking a secure area. Method 900 is illustrated in FIG. 9 as a set of processes 910-950. In some examples, processes 910-950 may be implemented on one or more application servers, such as application servers 230. In some examples, not all of the illustrated processes may be performed in all embodiments of method 900. Additionally, one or more processes not expressly illustrated in FIG. 9 may be included before, after, in between, or as part of processes 910-950, such as processes 410-450, 510-570, and/or 610-650. In some embodiments, one or more processes 910-950 may be implemented, at least in part, in the form of executable code stored on non-transitory, tangible, computer readable media that when run by one or more processors (e.g., a processor of the media device) may cause the one or more processors to perform one or more of processes 910-950.

In some examples, the first wireless media device may correspond to one or more of computing devices 110, 140, 170, media device 210, and/or vehicle media device 220, one or more sensors may include those sensors discussed above with respect to FIG. 2, and wireless communication device 306. In some examples, the geographic area corresponds to geographic area 304.

During a process 910, using a first software application on the first wireless media device, a message may be prompted on the first wireless media device in response to determining the first wireless media device has entered the geographic area, the message including executable instructions. In some examples, process 910 corresponds to process 420 as part of method 400. In some examples, the message includes a link, such as a deep link as discussed above with respect to FIG. 3.

During a process 920, in response to executing the executable instructions, a second application is launched on the first wireless media device. The second application may correspond to the second software application discussed above with respect to FIG. 3. In some examples, process 920 corresponds to process 430 as part of method 400.

During a process 930, a search request may be transmitted in response to launching the second application and executing the executable instructions, the search request parameters as discussed above with respect to FIG. 3 based on the executing of the executable instructions. In some examples, process 930 corresponds to process 440 as part of method 400.

During a process 940, a confirmation identifier may be received by the first wireless media device. In some examples, the confirmation identifier is transmitted from one or more application servers. In some examples, process 940 corresponds to process 450 as part of method 400.

During a process 950, the confirmation identifier may be transmitted by the wireless media device, the confirmation identifier causing a secured area to become unlocked. In some examples, the secured area may be a locked box or locker, such as an AMAZON LOCKER, a gate, a door, a garage, a gate arm, a lock to a vehicle or non-motor-powered means of transportation, and/or the like and/or a combination thereof.

Figure 10:
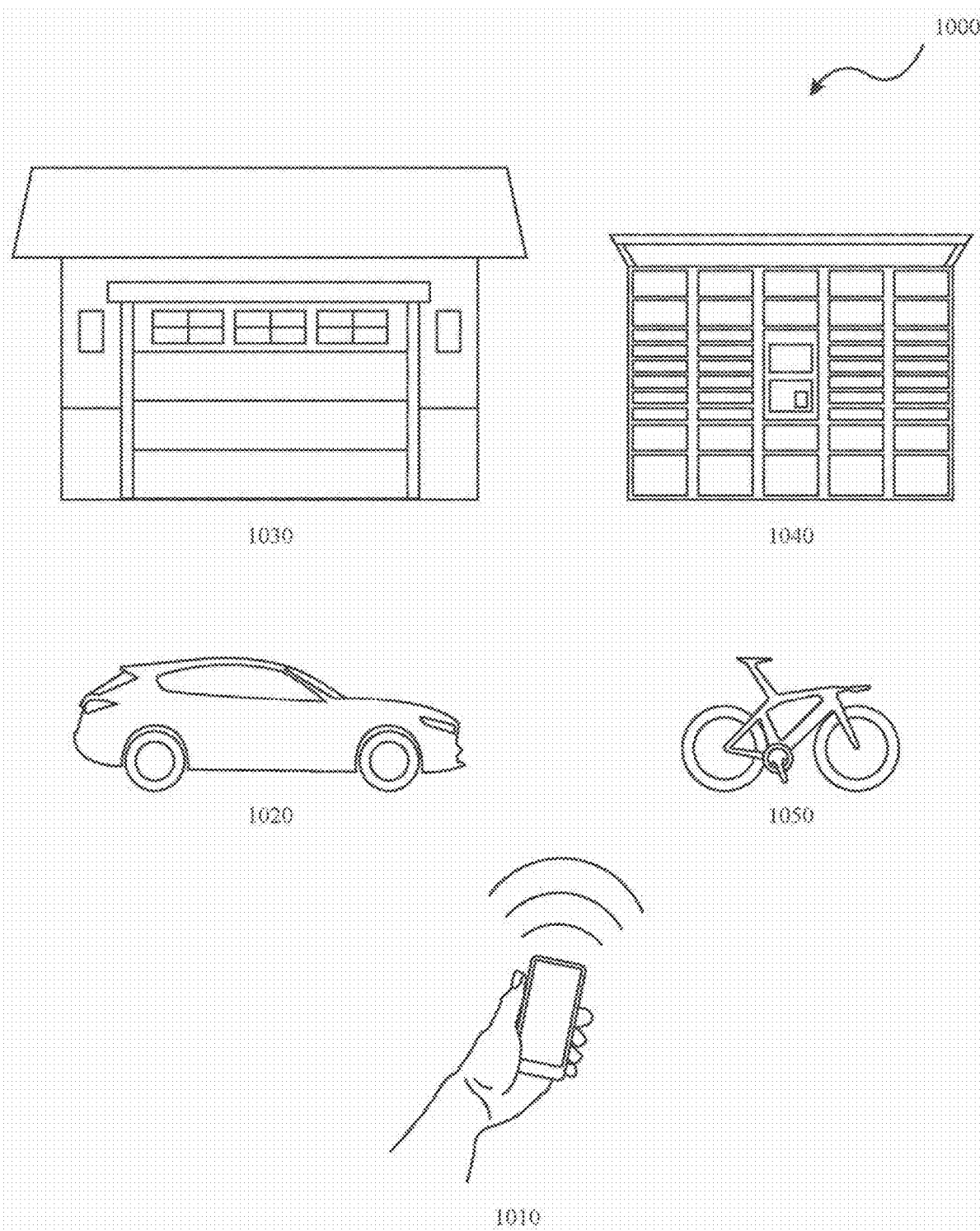
FIG. 10 is an example system for transmitting a search request for a listing location when a first wireless media device enters a geographic area, and subsequently unlocking a secure area.

FIG. 10 is an example system 1000 for unlocking a secured area with a wireless media device. In some examples, a wireless media device 1010 transmits a signal including one or more unique identifiers to a locking device, the locking device including a receiver and a locking mechanism that unlocks a secured area in response to the signal.

In some embodiments, a locking device may be included in a vehicle 1020, an entrance control mechanism 1030, a locker 1040, and a bicycle 1050. In some examples, vehicle 1020 corresponds with vehicle 250 and/or vehicle 308. In some examples, entrance control mechanism 1030 is a garage a gate, a gate arm, and/or the like. In some examples, a locker 1040 such as an AMAZON LOCKER. In some examples, one or more of vehicle 1020, entrance control mechanism 1030, and/or locker 1040 includes an NFC reader, RFID tag reader, a facial recognition device, retina scanner, a fingerprint reader, barcode scanner, and/or the like and/or combinations thereof.

Some advantages of disclosed embodiments include automatic verification with a wireless media device and unlocking of a secured area. In some examples, a driver, such as a factory worker, may arrive at a parking garage for work. The driver may use a smartphone to book a parking spot at the parking garage according to disclosed embodiments. The search request sent may include an employer ID or some other information to verify that the smartphone user is one of a select group that has restricted access. Upon verification, a unique identifier may be sent to provide access to a secure area. The secure area may be a storage locker, for instance, including work supplies provided to certain employees.

Some advantages further include automatic verification of a rental reservation and unlocking of a vehicle. In some examples, a smartphone user may arrive at a parking garage to pick up a rental vehicle. The smartphone user may receive a message to book a reservation, or the smartphone user may have already booked the reservation in advance upon entering the lot. Once the smartphone user has parked or been dropped off, the smartphone user may complete the reservation without having to interact with any rental agency personnel according to disclosed methods. Once the verification code has been received, the smartphone user may unlock a vehicle of his or her choosing. In some examples, once the vehicle is chosen, the smartphone may determine a type of vehicle chosen, and then notify the rental company so that the rental company may charge appropriately for the rental vehicle.

Some advantages further include unlocking a vehicle to provide gas filling services. Some companies provide a service where they deliver gasoline to vehicles while they are parked. A smartphone user may select the gas filling service as an amenity to be provided when sending a search request, according to disclosed embodiments. When the gas-filling service agent arrives at the vehicle, a unique identifier may be sent to the gas-filling service agent (which may have a smartphone) and this unique identifier may be used to unlock the vehicle and allow for the gas tank to be accessed and subsequently filled.

Figure 11:
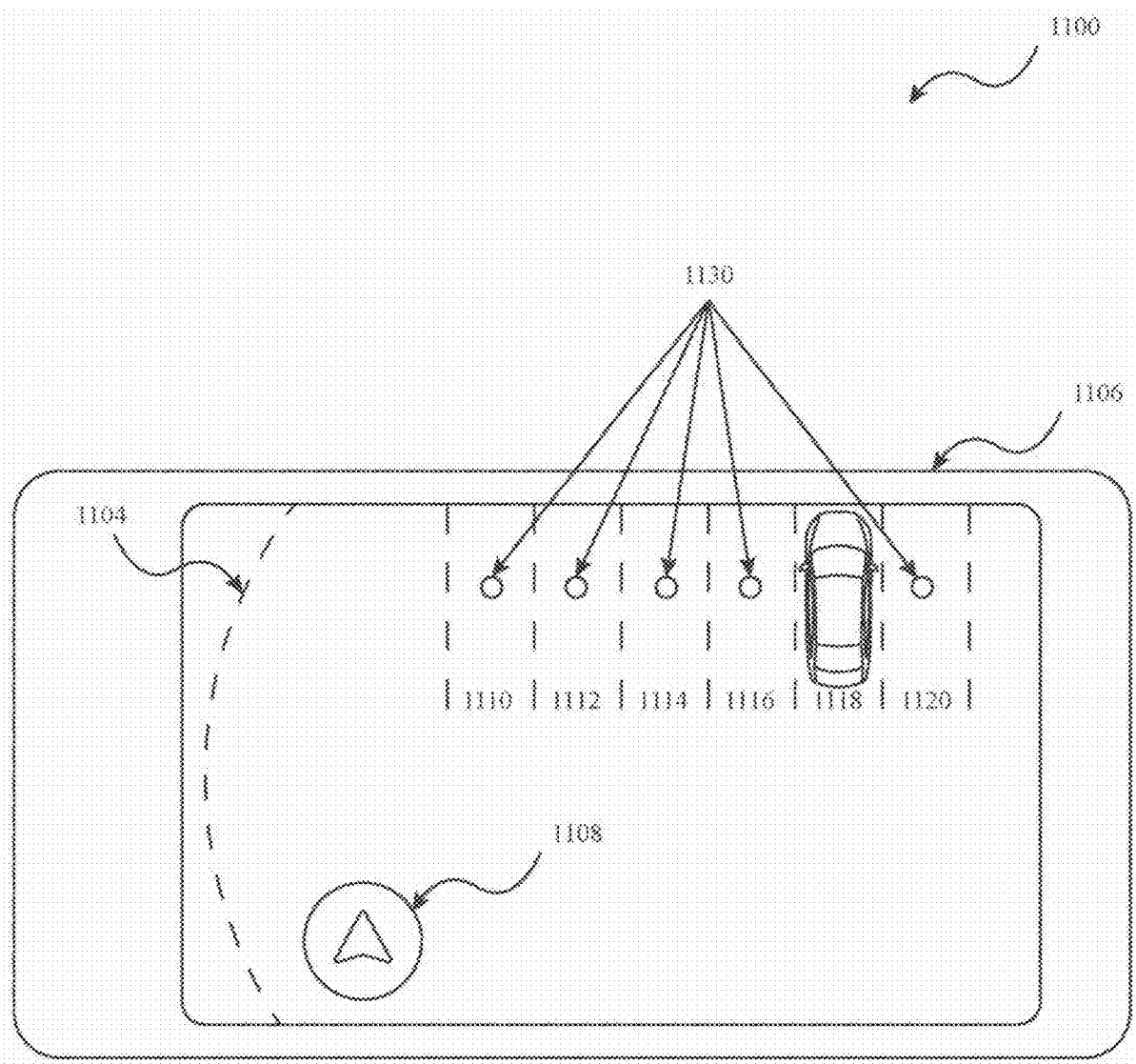
FIG. 11 is an example system for enabling location-related services within a geographic area.

FIG. 11 is an example system 1100 for enabling location-related services within a geographic area 1104. FIG. 11 shows the floor plan of a parking structure displayed on a wireless media device 1106 showing vehicle 1108 navigating through the parking structure. In some examples, geographic area 1104 includes listing locations 1110-1120. In some examples, listing locations may correspond with listing locations discussed above with respect to FIGS. 3-9. In some examples, geographic area 1104 may correspond with geographic area 304. In some examples, wireless media device 1106 may correspond to one or more of computing devices 110, 140, 170, media device 210, vehicle media device 220, wireless media device 306, wireless media device 810, on-board vehicle device 835, and/or wireless media device 1010. In some examples, vehicle 1108 corresponds with vehicle 250, vehicle 308, and/or vehicle 1020. In some examples, a wireless media device 1106 may enter geographic area 1104. In some aspects, using a mesh network, such as the mesh network discussed above with respect to FIG. 3, location data associated with wireless media device 1106 and/or vehicle 1108 may be monitored. In some examples, location of wireless media device 1106 may be derived using collective telemetric data of the beacons in the mesh network, including telemetric data between wireless media device 1106 and one or more beacons and location data of the one or more beacons. In some examples, wireless media device 1106 may receive and analyze high frequency, low-power electromagnetic radiation from multiple locations to triangulate a relative 3-D position and orientation within geographic area 1104. In some examples, trilateration may be used to device the coordinates of wireless media device 1106. Each of the beacon's coordinates may be determined using ultra-wide band (UWB), based on a time taken for each beacon to send a signal to another beacon. From this data, a map of beacons and their locations may be determined with respect to one another.

In some embodiments, using the location data of vehicle 1108, wireless media device 1106, and/or one or more beacons, a first software application may be used to provide instructions to wireless media device 1106 to a first listing location 1110.

In some embodiments, transmission of a search request, such as search request discussed above with respect to FIG. 5, may be delayed. In some examples, the search request is transmitted: when wireless media device 1106 is able to access a network, when wireless media device 1106 detects that it is relatively stationary, such the speed of wireless media device 1106 is less than 5 miles per hour, when wireless media device 1106 detects that it is located at or near (e.g., <1 meter) one or more listing locations 1110-1120 or another designated area, such as a temporary stopping location. In some examples, speed of wireless media device 1106 may be determined using an accelerometer, inertial unit, gyroscope, magnetometer, and/or the like and/or a combination thereof. In some examples, the inertial unit may be implemented as a multi-axis accelerometer including a three-axis accelerometer, a multi-axis gyroscope including a three-axis MEMS gyroscope, or a combination thereof. In some examples, one or more external sensors 1130 may be present in a vicinity of one or more listing locations 1110-1120. In some examples, one or more external sensors 1130 may be placed in vantage points, beneath a parking space, and other locations within geographic area 1104. In some examples, one or more external sensors include a camera, a magnetic sensor, infrared (IR) light transceiver, an IR distance sensor, an ultrasonic transmitter and detector, and/or the like and/or a combination thereof. In some examples, an application running on wireless media device 1106 may determine whether or not a user of wireless media device 1106 is also an operator of vehicle 1108. In some examples, a message may be prompted on wireless media device 1106 and user input may be used to indicate that the user is not an operator of vehicle 1108. In some examples, a search request may be transmitted in response to a determination that one or more passengers have exited vehicle 1108, based on data from one or more external sensors 1130.

Some advantages of disclosed embodiments include being able to monitor locations of vehicles and/or wireless media devices and provide directions to a listing location, even when data networks may temporarily be unavailable or have limited connectivity. Some advantages may also include social sharing of parking locations, so that groups that arrive to a parking lot may be able to find parking spaces close to other group members. Some advantages of disclosed embodiments may additionally include monitoring vehicles passenger occupancy status. For instance, when a smartphone user enters a parking lot, it may be determined that the smartphone has entered the parking lot in a vehicle. Based on monitoring speed, it may be determined that the vehicle in which the smartphone is present has stopped based on the location of the smartphone being within a parking space and/or based on detecting that the smartphone is stationary for 10-15 seconds. Once the smartphone user has exited the parking lot with the smartphone, it may be inferred that the vehicle is no longer occupied.

Some advantages of disclosed embodiments include increased safety of vehicle operation because completion of transactions may be delayed until a vehicle is stopped and/or safely within a parking space. A smartphone may detect movement of the smartphone, and a user may be asked if the user is currently operating a vehicle. If it is determined the user is operating a vehicle, the smartphone may disable the ability to complete reservation of a parking space until the vehicle is parked. External sensors may also be used to monitor once a vehicle has arrived and passengers have exited the vehicle.

In some embodiments, system 1100 is configured to provide automatic parking validation to wireless media device 1106. In some examples, a pass is received by wireless media device 1106 such as the pass discussed above with respect to FIG. 3. In some examples, the pass may include a voucher or coupon to visit a particular merchant. The pass may be transmitted or presented to a merchant located near the parking structure, for instance, at a mall or shopping center. When the pass is received by the merchant, the merchant may transmit using a media device a second pass to an application server, such as PIED PARKER's application servers. Upon receiving the second pass, the application server may verify whether the second pass is authorized based on a unique code included in the second pass and compare the unique code to a database of codes, which may be generated for the particular merchant based on a subscription model, in which a particular merchant is granted a number of validations to grant to their patrons. When the second pass is verified, a confirmation message may be transmitted to the merchant, a parking validation service, and/or wireless media device 1106. The confirmation message may include a confirmation identifier such as the confirmation identifier discussed above with respect to FIGS. 3-4, FIG. 7, and FIG. 9.

Some advantages of disclosed embodiments include increased accuracy for verifying vehicles that belong to patrons visiting nearby businesses. In some examples, parking enforcement may scan license plates or otherwise identify vehicles present at a parking structure at different times. Parking enforcement may give patrons a grace period, such as <2 hours, to visit a merchant near the parking structure and receive an automatic validation from the merchant. Using disclosed embodiments, a smartphone user may enter a parking structure and park at a certain time, visit a merchant near the parking structure and present a pass to the merchant, the merchant then transmitting a second pass to an application server. Upon verification of the second pass, the smartphone may then receive a confirmation message including a confirmation identifier. The confirmation message may be presented upon exiting the parking garage, but also parking enforcement may be sent the confirmation message as well. The confirmation message may cause a parking enforcement database to be updated so that the confirmation identifier corresponds with the vehicle such that, when parking enforcement inspects the smartphone user's vehicle present at the parking structure, the parking enforcement system will be able to verify that the vehicle corresponds with a particular smartphone user that visited a merchant near the parking structure.

As discussed above and further emphasized here, FIGS. 1-11 are merely examples, and should not unduly limit the scope of the claims. Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

In the foregoing description, specific details are set forth describing some embodiments consistent with the present disclosure. It will be apparent, however, to one skilled in the art that some embodiments may be practiced without some or all of these specific details. The specific embodiments disclosed herein are meant to be illustrative, but not limiting. Phrases including "such as" and "for example" are intended to be non-exclusive, and not limit embodiments to the set of things listed within those phrases. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional. Furthermore, other patents and patent applications may be incorporated by reference in order to avoid unnecessary description; the present disclosure's terms and definitions should take precedence over any terms and definitions used in such references, when in conflict with the present disclosure.

For purposes of this disclosure, a media device may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, a media device may be a personal computer, a portable digital assistant (PDA), a consumer electronic device, a display device or monitor, a smartphone, or any other suitable device and may vary in size, shape, performance, functionality, and price. The media device may include memory, one or more processing resources such as a central processing unit (CPU) or hardware or software control logic. Additional components of the media device may include one or more storage devices, one or more communications ports for communicating with external devices as well as various input and output (I/O) devices, such as a keyboard, a mouse, a touchscreen, button inputs, a microphone, a motion sensor, and/or a video display.

What is claimed is:

1. A vehicle parking payment processing system, comprising:
   a non-transitory memory;

one or more processors coupled to the non-transitory memory and configured to execute instructions to perform operations comprising:

monitoring location data collected through a first software app installed on a first mobile device associated with a first vehicle, wherein the first software app is provided by a first service provider;

determining the first mobile device has entered or departed a geographic area based on the monitored location data collected through a first software app installed on the first mobile device;

presenting a user-selectable message from the first software app installed on the first mobile device in response to determining the first mobile device has entered or departed the geographic area, the user-selectable message including executable instructions;

receiving a user selection of the user-selectable message presented within the first software app;

executing the executable instructions in the user-selectable message to launch a second software app installed on the first mobile device in response to the user selection, wherein the second software app is provided by a second service provider different from the first service provider and wherein the second software app is distinct and separate from the first software app;

automatically, without requiring user input, accessing the monitored location data collected through the first software app;

automatically, without requiring user input, determining a plurality of search request parameters based on the monitored location data collected through the first software app;

automatically, without requiring user input, providing the plurality of search request parameters to the second software app that is distinct and separate from the first software app;

generate, within the second software app, a search request for a plurality of parking locations in accordance with the plurality of search request parameters;

obtaining search results including a plurality of parking locations in accordance with the search request; and presenting the search results including the plurality of parking locations within the second software app.

2. The vehicle parking payment processing system of claim 1, wherein the predetermined geographic boundary is dynamically adjusted using machine learning and wherein the determining is based on one of:
  i) capturing, by a camera of the first mobile device, a coded image;
  ii) receiving, by the first mobile device, a signal within the geographic area, the signal including an identifier; and
  iii) determining a location of the first mobile device has crossed a predetermined geographic boundary.

3. The vehicle parking payment processing system of claim 1, wherein it is determined the first mobile device has entered or departed the geographic area in response to matching, by the first mobile device, a first identifier included in the signal sent by a broadcast device.

4. The vehicle parking payment processing system of claim 1, the operations further comprising determining the first mobile device has entered or departed the geographic area based on a machine learning model.

5. The vehicle parking payment processing system of claim 2, wherein it is determined the first mobile device has entered or departed the geographic area in response to matching, by the first mobile device, a first identifier within the signal sent by a broadcast device with a second identifier associated with the coded image.

6. The vehicle parking payment processing system of claim 1, wherein the user-selectable message includes a deep link.

7. The vehicle parking payment processing system of claim 6, wherein activation of the deep link causes the launching of the second software application on the first mobile device and generates one or more search request parameters included in the search request.

8. The vehicle parking payment processing system of claim 1, wherein the search request parameters include one or more of the group consisting of proximity of the first mobile device to listing locations, temporal duration of reservation period, price range for listing locations, and a type of listing location.

9. A vehicle parking payment processing method, comprising:
  at a computing device, coupled to database including parameters associated with a plurality of listing locations, the computing device including one or more processors and memory storing one or more programs for execution by one or more processors, which, when executed by the one or more processors cause the one or more processors to perform:

monitoring location data collected through a first software app installed on-a first mobile device associated with a first vehicle, wherein the first software app is provided by a first service provider;

determining the first mobile device has entered or departed a geographic area based on the monitored location data collected through a first software app installed on the first mobile device;

presenting a user-selectable message from the first software app installed on the first mobile device in response to determining the first mobile device has entered or departed the geographic area, the user-selectable message including executable instructions;

receiving a user selection of the user-selectable message presented within the first software app;

executing the executable instructions in the user-selectable message to launch a second software app installed on the first mobile device in response to the user selection, wherein the second software app is provided by a second service provider different from the first service provider and wherein the second software app is distinct and separate from the first software app;

automatically, without requiring user input, accessing the monitored location data collected through the first software app;

automatically, without requiring user input, determining a plurality of search request parameters based on the monitored location data collected through the first software app;

automatically, without requiring user input, providing the plurality of search request parameters to the second software app that is distinct and separate from the first software app;

generate, within the second software app, a search request for a plurality of parking locations in accordance with the plurality of search request parameters;

obtaining search results including a plurality of parking locations in accordance with the search request; and presenting the search results including the plurality of parking locations within the second software app.

10. The method of claim 9, wherein determining the first mobile user device has entered or departed the geographic area is based on the location data and a predetermined virtual boundary.

11. The method of claim 10, wherein the predetermined virtual boundary is a geofenced location enabled via a mesh network.

12. The method of claim 9, wherein determining the first mobile user device has entered or departed the geographic area is based on matching, by the first mobile user device, a first identifier included within a signal sent by a broadcast device with a plurality of identifiers.

13. The method of claim 9, wherein determining the first mobile user device has entered or departed the geographic area is further based on matching, by the first mobile user device, a first identifier included within a signal sent by a broadcast device with a second identifier extracted from a coded image.

14. The method of claim 9, wherein the message includes a deep link.

15. The method of claim 9, wherein the first mobile user device is an on-board vehicle computer.

16. The method of claim 9, wherein transmitting the search request for the first listing location is performed in response to determining that the first mobile user device is within a designated transmission area.

17. The method of claim 9, wherein transmitting the search request for the first listing location is performed in response to detecting network connectivity.

18. The method of claim 9, further comprising receiving, by the first mobile user device, a confirmation identifier, the confirmation identifier configured to cause a secured area to become unlocked.

19. A vehicle parking payment system, comprising:

a non-transitory memory;

one or more processors coupled to the non-transitory memory and configured to execute instructions to perform operations comprising:

monitoring location data collected through a first software app installed on a first mobile device associated with a first vehicle, wherein the first software app is provided by a first service provider;

determining the first mobile device has entered or departed a geographic area based on the monitored location data collected through a first software app installed on the first mobile device;

presenting a user-selectable message from the first software app installed on the first mobile device in response to determining the first mobile device has entered or departed the geographic area, the user-selectable message including executable instructions;

receiving a user selection of the user-selectable message presented within the first software app;

executing the executable instructions in the user-selectable message to launch a second software app installed on the first mobile device in response to the user selection, wherein the second software app is provided by a second service provider different from the first service provider and wherein the second software app is distinct and separate from the first software app;

automatically, without requiring user input, accessing the monitored location data collected through the first software app;

automatically, without requiring user input, determining a plurality of search request parameters based on the monitored location data collected through the first software app;

automatically, without requiring user input, providing the plurality of search request parameters to the second software app that is distinct and separate from the first software app;

generate, within the second software app, a search request for a plurality of parking locations in accordance with the plurality of search request parameters;

obtaining search results including a plurality of parking locations in accordance with the search request; and presenting the search results including the plurality of parking locations within the second software app.

20. The vehicle parking payment processing system of claim 19, wherein the short range wireless communication includes one of a visual display of a quick response (QR) code, near field communication (NFC), BLUETOOTH, infrared, radio-frequency identification, and Wi-Fi.

* * * * *